(12) United States Patent
Ghanekar et al.

(10) Patent No.: US 10,379,813 B1
(45) Date of Patent: Aug. 13, 2019

(54) SYSTEM AND METHOD FOR SIGNAL PROCESSING USING SORTING BASED FILTERING

(71) Applicant: Cadence Design Systems, Inc., San Jose, CA (US)

(72) Inventors: Sachin P. Ghanekar, Pune (IN); Pavan Shridhar Jalwadi, Pune (IN)

(73) Assignee: Cadence Design Systems, Inc., San Jose, CA (US)

(*) Notice: Subject to any disclaimer, the term of this patent is extended or adjusted under 35 U.S.C. 154(b) by 325 days.

(21) Appl. No.: 15/213,728

(22) Filed: Jul. 19, 2016

(51) Int. Cl.
*G06F 7/24* (2006.01)

(52) U.S. Cl.
CPC ..................... *G06F 7/24* (2013.01)

(58) Field of Classification Search
CPC ....... H04W 4/02; H04W 4/023; H04W 4/025; H04W 64/00; H04W 64/003; H04W 84/18; H04W 12/06; H04W 40/20; H04W 40/244; H04W 92/18; G06F 17/30386; G06F 17/30595; G06F 19/22; G06F 19/28; G06F 11/1435; G06F 11/1451; G06F 11/1456; G06F 11/1464; G06F 11/1469; G06F 11/1471; G06F 17/3023; G06F 17/2241; G06F 17/245; G06F 17/246; G06F 17/30; G06F 21/80; G06F 8/34; G06Q 30/063; G06Q 30/0633; G06Q 10/0833; G06Q 10/087; G06T 7/0004; G06T 2200/28; G06T 2207/10016; G06T 2207/10024; G06T 2207/20076; G06T 2207/30232; G06T 7/11; G06T 7/136; G06T 7/174; G06T 7/187; G06T 11/40; G06T 15/005; G06T 15/04; G06T 15/20; G06T 15/30;
(Continued)

(56) References Cited

U.S. PATENT DOCUMENTS

| 5,043,808 A | * | 8/1991 | Knauer | ................... | H04N 7/015 348/E7.004 |
| 5,148,274 A | * | 9/1992 | Knauer | ................... | H04N 7/015 348/469 |

(Continued)

OTHER PUBLICATIONS

Blum, Manuel, et al. "Time Bounds for Selection," Journal of Computer and System Sciences 7, 448-461 (1973).

*Primary Examiner* — Aklilu K Woldemariam
(74) *Attorney, Agent, or Firm* — Mark H. Whittenberger, Esq.; Holland & Knight LLP

(57) ABSTRACT

Embodiments may include receiving an input block of data having one or more rows wherein each row includes one or more elements. Embodiments may further include adjusting the input block of data to generate a two-dimensional sorted block of data and identifying at least one position within the two-dimensional sorted block of data that cannot contain a median value or a desired Nth sorted value. Embodiments may also include sorting the two-dimensional block of data along one or more columns to obtain one or more candidate elements that contain the median value or the desired Nth sorted value. Embodiments may include discarding at least one non-candidate element to generate one or more remaining elements and rearranging the one or more remaining elements such that a number of diagonal elements form a column. Embodiments may also include iteratively repeating some of the above operations until a desired value is identified.

20 Claims, 35 Drawing Sheets

(58) Field of Classification Search
CPC ....... G06T 15/50; G06T 15/83; G06T 15/405;
G06T 11/001; G06T 15/40; G06T 15/80;
G06T 15/87; G06T 1/60; G06T 9/008;
G06K 9/00228; H04N 19/61; H04L
41/0816; H04L 43/16; H04L 67/104;
H04H 20/16; G01N 30/86
USPC ....... 382/262, 219, 217, 218, 143, 144, 199,
382/148, 288, 112
See application file for complete search history.

(56) References Cited

U.S. PATENT DOCUMENTS

| | | | | |
|---|---|---|---|---|
| 7,522,772 B2* | 4/2009 | Porter | ................. | G06K 9/00228 |
| | | | | 382/103 |
| 8,331,695 B1* | 12/2012 | Delva | ................. | G06T 7/136 |
| | | | | 382/218 |
| 9,582,845 B2* | 2/2017 | Nystad | ................. | H04N 19/90 |
| 2002/0091728 A1* | 7/2002 | Kjaer | ................. | G06F 17/246 |
| | | | | 715/212 |
| 2004/0146205 A1* | 7/2004 | Becker | ................. | H04N 19/176 |
| | | | | 382/232 |
| 2005/0129275 A1* | 6/2005 | Porter | ................. | G06K 9/00228 |
| | | | | 382/103 |
| 2005/0129276 A1* | 6/2005 | Haynes | ................. | G06K 9/00228 |
| | | | | 382/103 |
| 2007/0179760 A1* | 8/2007 | Smith | ................. | G06F 17/50 |
| | | | | 703/2 |
| 2008/0175454 A1* | 7/2008 | Osumi | ................. | G06T 5/20 |
| | | | | 382/128 |
| 2009/0112089 A1* | 4/2009 | Barnard | ................. | A61B 5/204 |
| | | | | 600/443 |
| 2011/0206119 A1* | 8/2011 | Bivolarsky | ................. | H04N 19/105 |
| | | | | 375/240.12 |
| 2013/0236075 A1* | 9/2013 | Smith | ................. | G06T 7/0014 |
| | | | | 382/131 |

* cited by examiner

200

202 — receiving, using at least one processor, a one or two-dimensional input block of data having one or more sorted or unsorted rows wherein each row includes one or more elements 204 — adjusting the input block of data to generate a two-dimensional sorted block of data 206 — identifying at least one position within the two-dimensional sorted block of data that cannot contain a median value or a desired Nth sorted value 208 — sorting the two-dimensional block of data along one or more columns to obtain one or more candidate elements that contain the median value or the desired Nth sorted value 210 — discarding at least one non-candidate element to generate one or more remaining elements 212 — rearranging the one or more remaining elements such that a number of diagonal elements form a column 214 — iteratively repeating one or more of the adjusting, identifying, sorting, discarding, and rearranging operations until a desired value of the input block of data is identified

500 
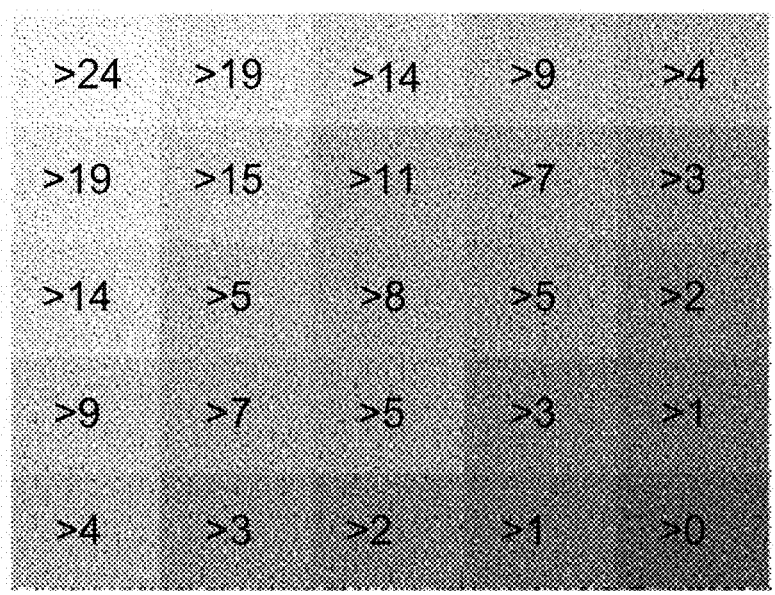
FIG. 5

700

800

1000

1100

1200

1400

1500

1600
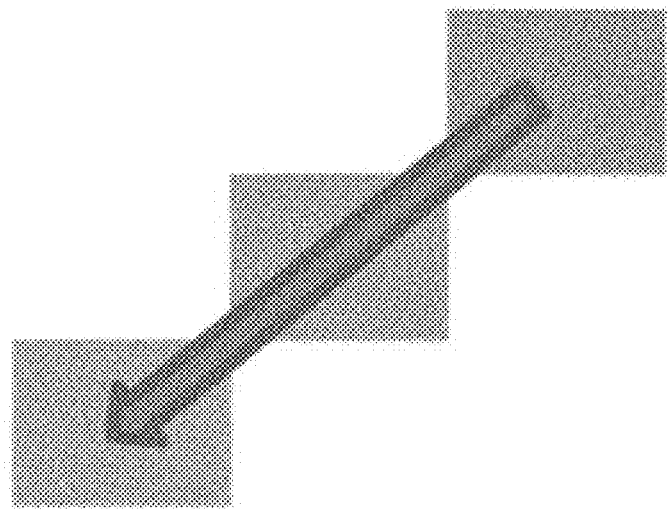
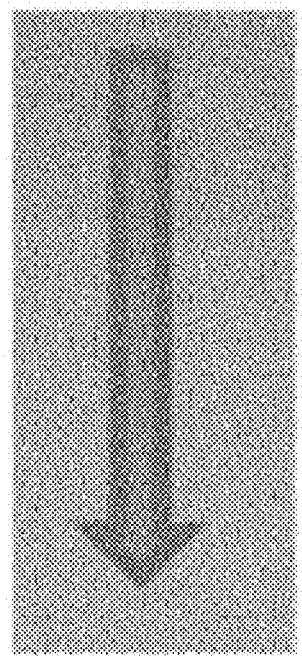
FIG. 16

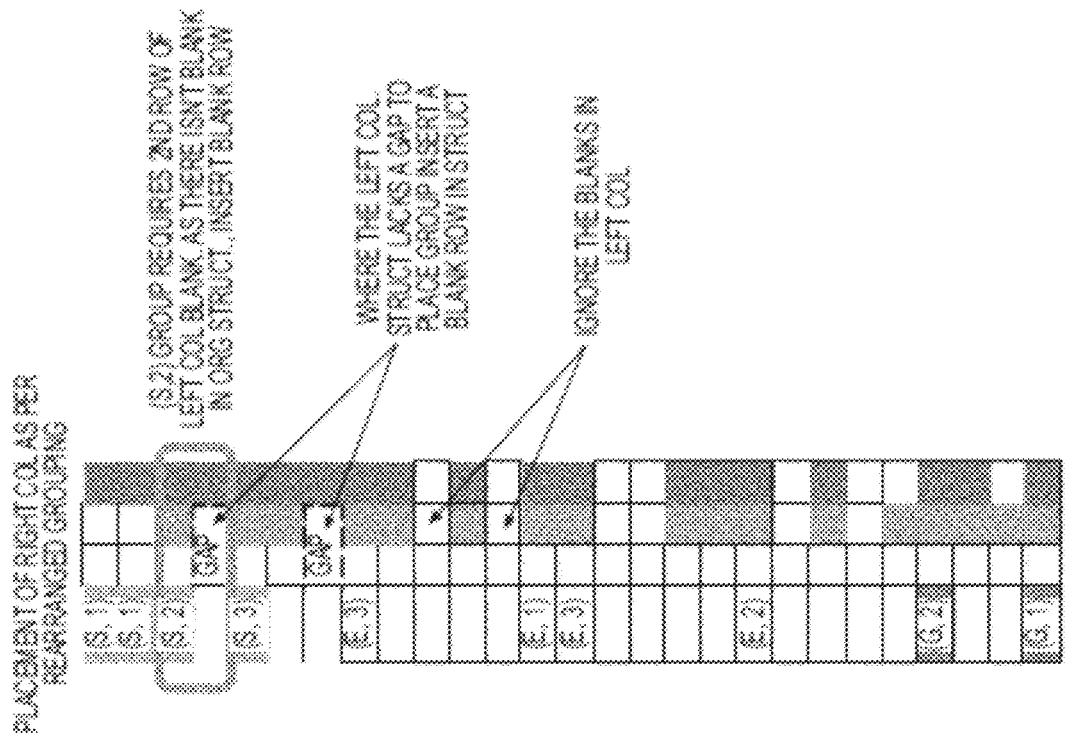
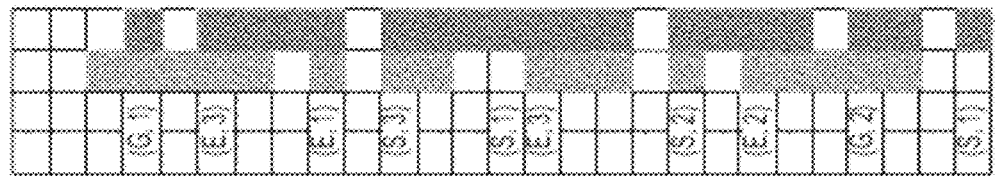
FIG. 26

SYSTEM AND METHOD FOR SIGNAL PROCESSING USING SORTING BASED FILTERING

FIELD OF THE INVENTION

The present disclosure relates to signal processing, and more specifically, to signal processing techniques using sorting based filtering.

DISCUSSION OF THE RELATED ART

Two dimensional median filtering is widely used in image processing for removing noise in severely corrupted images. It is particularly useful as it may be employed without compromising the edges. This is often performed as a pre-processing step to improve the results of one or more subsequent processing operations.

SUMMARY

In one or more embodiments of the present disclosure, a computer-implemented method for use in signal processing is provided. The method may include receiving, using at least one processor, a one or two-dimensional input block of data having one or more sorted or unsorted rows wherein each row includes one or more elements. The method may also include adjusting the input block of data to generate a two-dimensional sorted block of data and identifying at least one position within the two-dimensional sorted block of data that cannot contain a median value or a desired Nth sorted value. The method may further include sorting the two-dimensional block of data along one or more columns to obtain one or more candidate elements that contain the median value or the desired Nth sorted value. The method may also include discarding at least one non-candidate element to generate one or more remaining elements and rearranging the one or more remaining elements such that a number of diagonal elements form a column. The method may include iteratively repeating one or more of the adjusting, identifying, sorting, discarding, and rearranging operations until a desired value of the input block of data is identified.

One or more of the following features may be included. In some embodiments, identifying may include identifying at least one element located at a corner of the two-dimensional input block of data. The two-dimensional input block of data may be an M×N block of data. The desired value may be a median value, an Nth minimum value, an Nth maximum value, and/or a plurality of values. The two-dimensional input block of data may be sorted along columns and iteratively repeating includes sorting along one or more rows. In some embodiments, iteratively repeating the sorting along one or more rows may be performed partially. In some embodiments, iteratively repeating the sorting along one or more rows may be performed partially to identify at least one value to be discarded.

In another embodiment of the present disclosure a system for use in signal processing is provided. The system may include a computing device having at least one processor configured to receive, using at least one processor, a one or two-dimensional input block of data having one or more sorted or unsorted rows wherein each row includes one or more elements. The at least one processor may be configured to adjust the input block of data to generate a two-dimensional sorted block of data and to identify at least one position within the two-dimensional sorted block of data that cannot contain a median value or a desired Nth sorted value. The at least one processor may be further configured to sort the two-dimensional block of data along one or more columns to obtain one or more candidate elements that contain the median value or the desired Nth sorted value. The at least one processor may be further configured to discard at least one non-candidate element to generate one or more remaining elements and to rearrange the one or more remaining elements such that a number of diagonal elements form a column. The at least one processor may be further configured to iteratively repeat one or more of the adjusting, identifying, sorting, discarding, and rearranging operations until a desired value of the input block of data is identified.

One or more of the following features may be included. In some embodiments, identifying may include identifying at least one element located at a corner of the two-dimensional input block of data. The two-dimensional input block of data may be an M×N block of data. The desired value may be a median value, an Nth minimum value, an Nth maximum value, and/or a plurality of values. The two-dimensional input block of data may be sorted along columns and iteratively repeating includes sorting along one or more rows. In some embodiments, iteratively repeating the sorting along one or more rows may be performed partially. In some embodiments, iteratively repeating the sorting along one or more rows may be performed partially to identify at least one value to be discarded.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 2 is a flowchart depicting operations of the identification process in accordance with an embodiment of the present disclosure;

FIG. 5 is a diagram depicting an embodiment of the identification process in accordance with an embodiment of the present disclosure;

FIG. 16 is a diagram depicting an embodiment of the identification process in accordance with an embodiment of the present disclosure;

FIG. 18 is a diagram depicting an embodiment of the identification process in accordance with an embodiment of the present disclosure;

FIG. 19A is a diagram depicting an embodiment of the identification process in accordance with an embodiment of the present disclosure;

FIG. 19B is a diagram depicting an embodiment of the identification process in accordance with an embodiment of the present disclosure;

FIG. 19C is a diagram depicting an embodiment of the identification process in accordance with an embodiment of the present disclosure;

FIG. 26 is a diagram depicting an embodiment of the identification process in accordance with an embodiment of the present disclosure;

DETAILED DESCRIPTION

Figure 1:
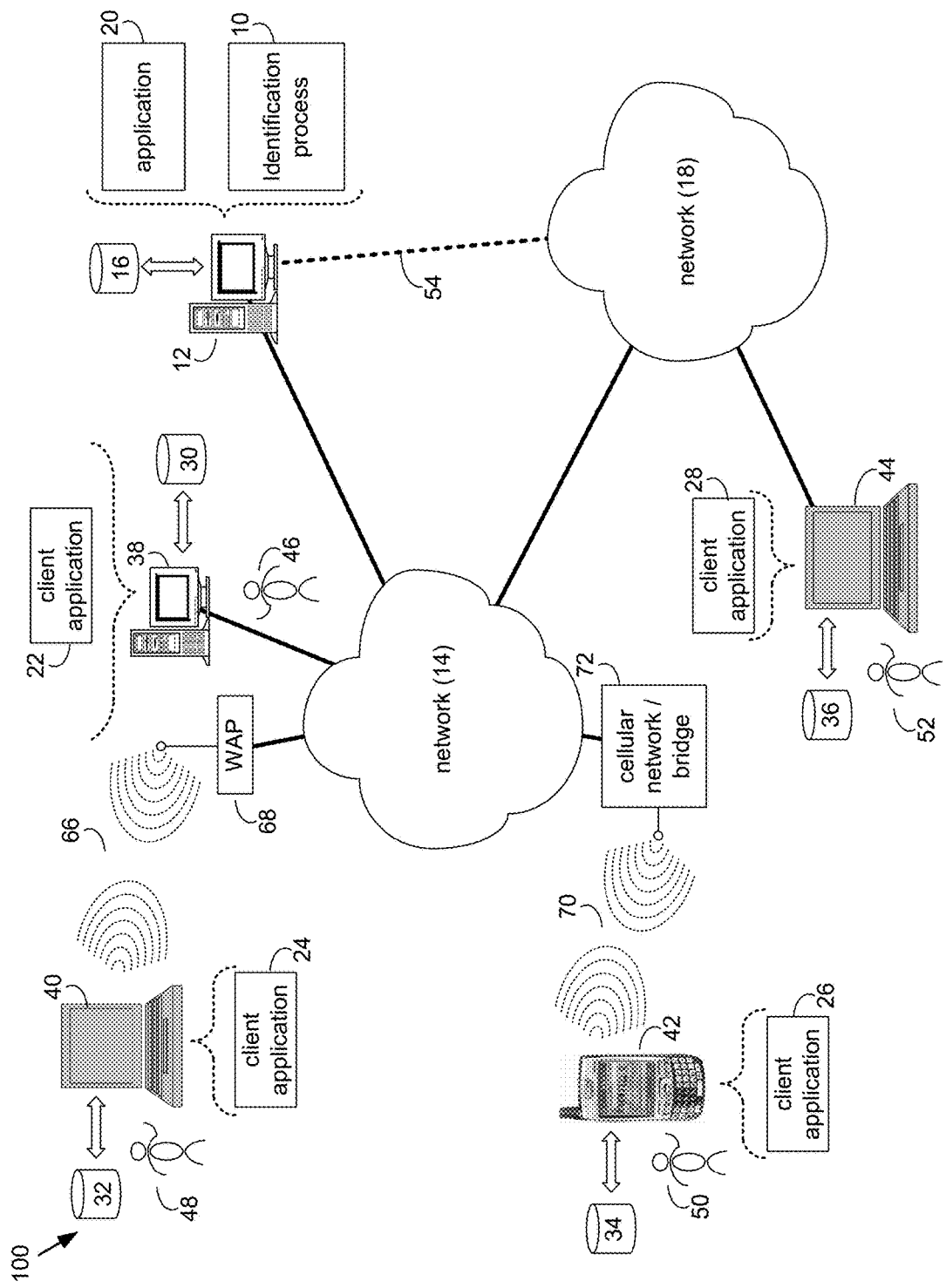
FIG. 1 is a diagram depicting an embodiment of a system in accordance with the present disclosure.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language, assembly language of digital signal processors or embedded processors, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown an identification process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the identification process 10 may reside on and be executed, in whole or in part, by a client electronic device, such as a personal computer, notebook computer, personal digital assistant, or the like.

The instruction sets and subroutines of identification process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an application (e.g., application 20). Application 20 may interact with one or more client applications (e.g., client applications 22, 24, 26, 28) for hyper-parameter analysis. Application 20 may use identification process 10 as part of an automated tool.

In some embodiments, identification process 10 may be a stand-alone application, or may be an applet/application/script that may interact with and/or be executed within application 20. In addition/as an alternative to being a server-side process, the identification process 10 may be a client-side process (not shown) that may reside on a client electronic device (described below) and may interact with an client application (e.g., one or more of client applications 22, 24, 26, 28). Further, the identification process 10 may be a hybrid server-side/client-side process that may interact with application 20 and a client application (e.g., one or more of client applications 22, 24, 26, 28). As such, the identification process 10 may reside, in whole, or in part, on server computer 12 and/or one or more client electronic devices.

The instruction sets and subroutines of application 20, which may be stored on storage device 16 coupled to server computer 12 may be executed by one or more processors (not shown) and one or more memory modules (not shown) incorporated into server computer 12.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access MLCS application 20 and may allow users to e.g., utilize identification process 10.

Users 46, 48, 50, 52 may access application 20 directly through the device on which the client application (e.g., client applications 22, 24, 26, 28) is executed, namely client electronic devices 38, 40, 42, 44, for example. Users 46, 48, 50, 52 may access application 20 directly through network 14 or through secondary network 18. Further, server computer 12 (i.e., the computer that executes application 20) may be connected to network 14 through secondary network 18, as illustrated with phantom link line 54. In some embodiments, accessing input data for recognition at an electronic device 38, 40, 42, 44 can include receiving an input from a server computer 12 through one or more of network 14 and secondary network 18.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.)

Referring also to FIG. 2, a flowchart depicting an embodiment of identification process 10 is provided. In some embodiments, identification process 10 may include receiving (202), using at least one processor, a one or two-dimensional input block of data having one or more sorted or unsorted rows wherein each row includes one or more elements. In some embodiments, a pre-processing step may be included. This may include arranging the rows as per Initial ODSI structure as per flowchart in FIG. 27. If the rows are not sorted then the process may include sorting the rows.

Receiving 202 may include receiving non-sorted two-dimensional and one dimensional structures. The method may further include adjusting (204) the input block of data to generate a two-dimensional sorted block of data and identifying (206) at least one position within the two-dimensional sorted block of data that cannot contain a median value or a desired Nth sorted value. The method may further include sorting (208) the two-dimensional block of data along one or more columns to obtain one or more candidate elements that contain the median value or the desired Nth sorted value. The method may also include discarding (210) at least one non-candidate element to generate one or more remaining elements and rearranging (212) the one or more remaining elements such that a number of diagonal elements form a column. The method may include iteratively repeating (214) one or more of the adjusting, identifying, sorting, discarding, and rearranging operations until a desired value of the input block of data is identified. These and numerous additional operations are also within the scope of the present disclosure, each of which are discussed below in further detail. For example, in some embodiments, the sorting direction of rows and/or columns can be changed and the corner element identification and iterative rearrangement operations may be performed in the corresponding direction.

Embodiments of the present disclosure include systems and methods for efficiently identifying the median of a 2-D structure of any shape and size (e.g. diagonally symmetric) by systematically eliminating non-median candidates. As discussed in further detail below with reference to FIGS. 3-16, a number of diagrams are provided that show one or more operations that may be used to calculate the median of a 5×5 array. It should be noted that in these embodiments, the input may be assumed to be fully 1-D sorted in the row direction (e.g. horizontal) and subsequent steps require partial column sorting (e.g. vertical). However, it should be noted that embodiments of the present disclosure may be easily modified to start with a full 1-D sorting of the column direction (e.g., vertical) and subsequent steps require partial row sorting (e.g. horizontal) without departing from the scope of the present disclosure. Additionally and/or alternatively, embodiments of the present disclosure may be extended to 2-D structures of any shape and size with or without gaps, missing regions to find Nth min/max of values in the structure.

The embodiments provided below may include a number of below properties. For example, in a 2-D structure the sorting in row (or column) direction does not get disturbed if it is followed by sorting in the column (or row) direction. Additionally and/or alternatively, if an equal number of non-median elements on either side of the median (smaller and higher side of median) are eliminated from the input set, then the median of the remaining sub-set is still the median of the entire input set. Finally, in a row and partial column sorted 2-D array, a set of elements in diagonals may be rearranged as columns such that the row sorting remains preserved.

In some embodiments, the varying darkness of the color in FIGS. 3-16 may correspond to different numerical values of elements of the 2-D array. For example, the lightest shade may correspond to the lowest numerical value with the increasing darkest shades corresponding to the increasing numerical values.

Referring again to FIG. 3, an embodiment consistent with identification process 10 is provided. In this particular embodiment a diagram 300 displays an example of an input 2-D square array with all rows (1-D arrays) fully sorted initially. Here, there are 25 distinct numbers shown although any number may be used in accordance with the teachings of the present disclosure. Accordingly, once 12 higher numbers and 12 lower numbers are identified, then at that point, the median may be identified. As shown in the diagram, in this example, from left to right in any row, the intensity of the shade is increasing.

Figure 3:
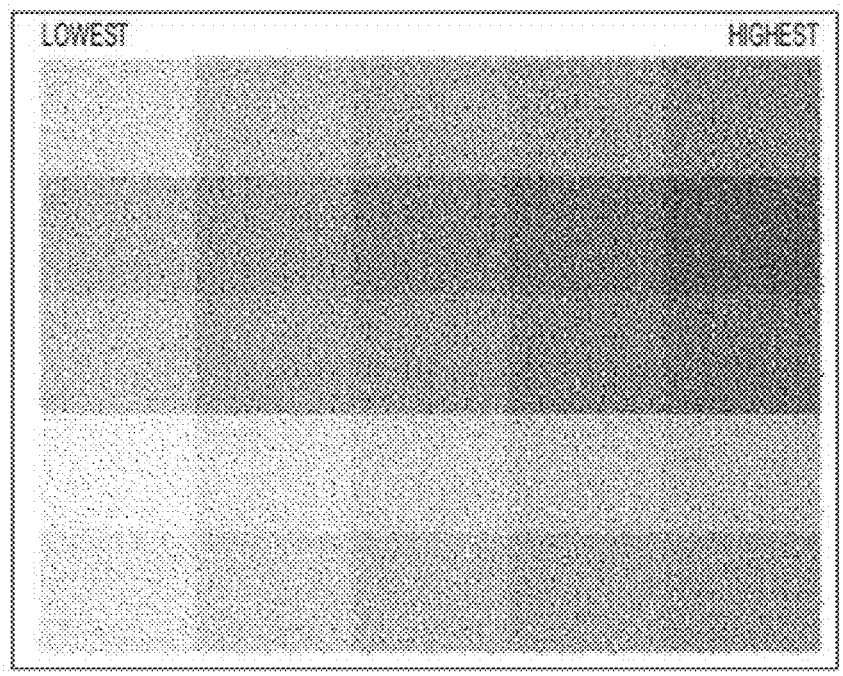
FIG. 3 is a diagram depicting an embodiment of the identification process in accordance with an embodiment of the present disclosure.
Figure 4:
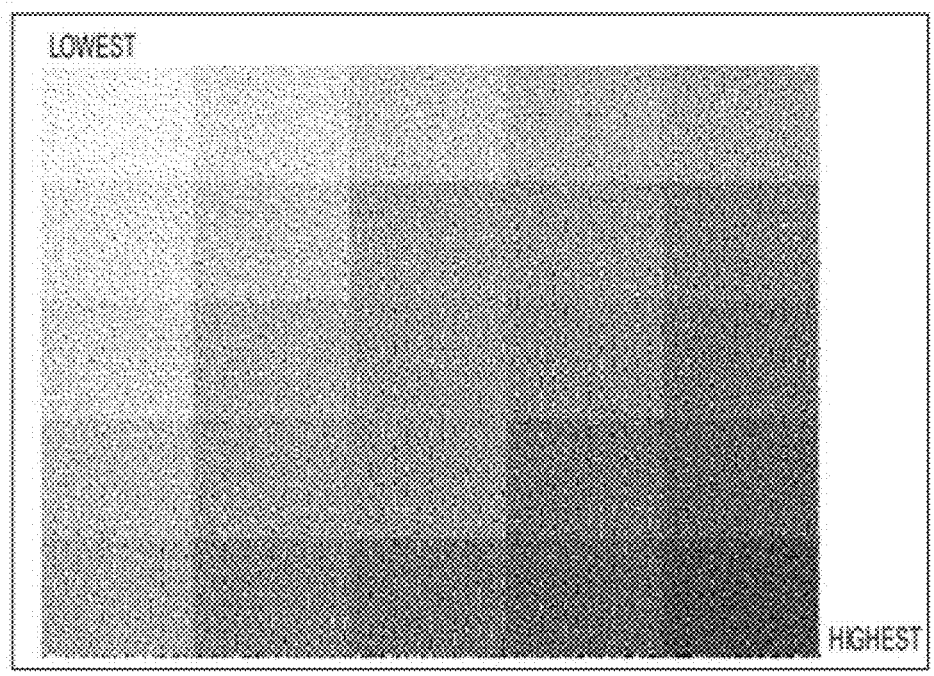
FIG. 4 is a diagram depicting an embodiment of the identification process in accordance with an embodiment of the present disclosure.

Referring now to FIG. 4, another embodiment consistent with identification process 10 is provided. In some embodiments, this operation may follow that described above in FIG. 3. In this example, the columns (1-D arrays) of the input array of FIG. 3 are virtually sorted. This representation may serve as a temporary representation for identifying non-median elements only. For actual median calculations, the full column sorting as shown in this step is may not be required. Note that the column sorting does not destroy the sorting order along the row. In this particular example, the top to bottom intensity is shown increasing and the element in the center of the array is not the median.

Referring now to FIG. 5, another embodiment consistent with identification process 10 is provided. In some embodiments, this operation may follow that described above in FIG. 4. In this example, an estimation of the number of elements in the 2-D array guaranteed to be greater than the current element in that cell is generated. The count in each cell may represent the number of elements guaranteed to be greater than the element in that cell itself. Again, note that the column sorting does not destroy the sorting order along the row.

Figure 6:
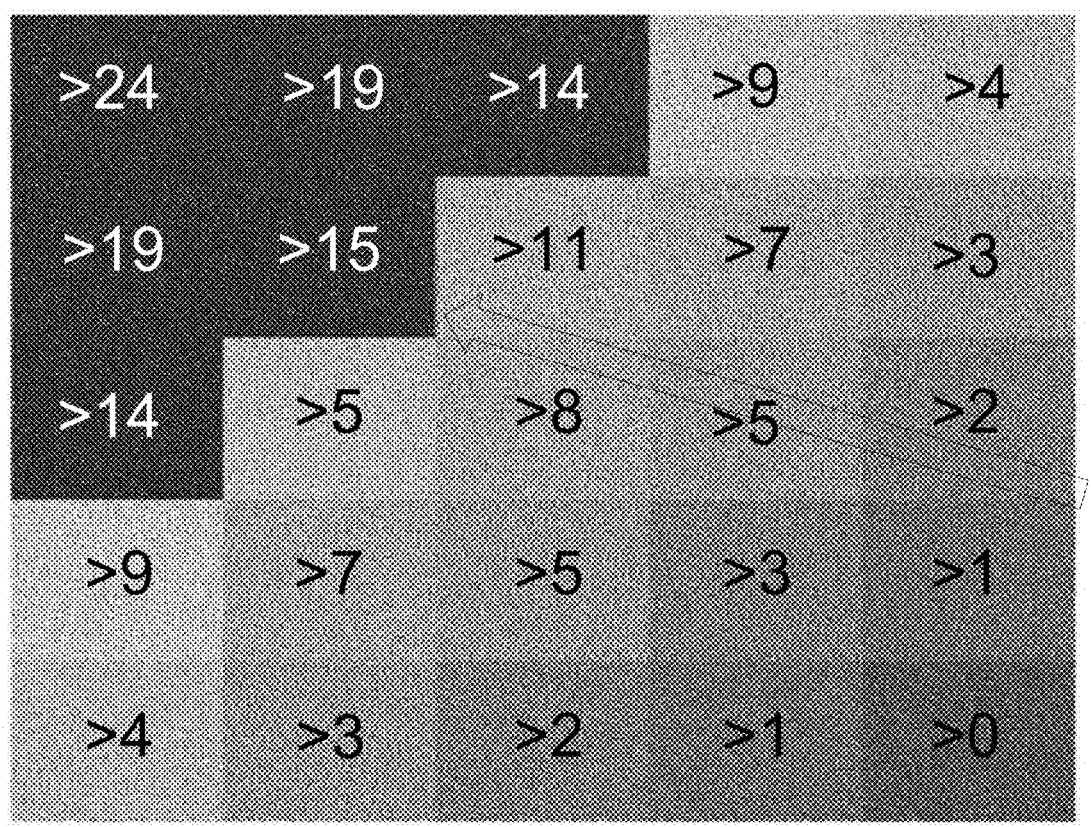
FIG. 6 is a diagram depicting an embodiment of the identification process in accordance with an embodiment of the present disclosure.

Referring now to FIG. 6, another embodiment consistent with identification process 10 is provided. In some embodiments, this operation may follow that described above in FIG. 5. In this example, an elimination of non-median candidates is performed. Note that for a 5×5 median, the element that has 13 or more elements greater than itself, can not be the median. Thus, the left top corner elements may be identified as non-median elements. (Note 13=ceil(5×5/2)). In other words, this operation allows for the elimination of non-median candidates, e.g., the elements having 13 or more elements greater than itself.

Figure 7:
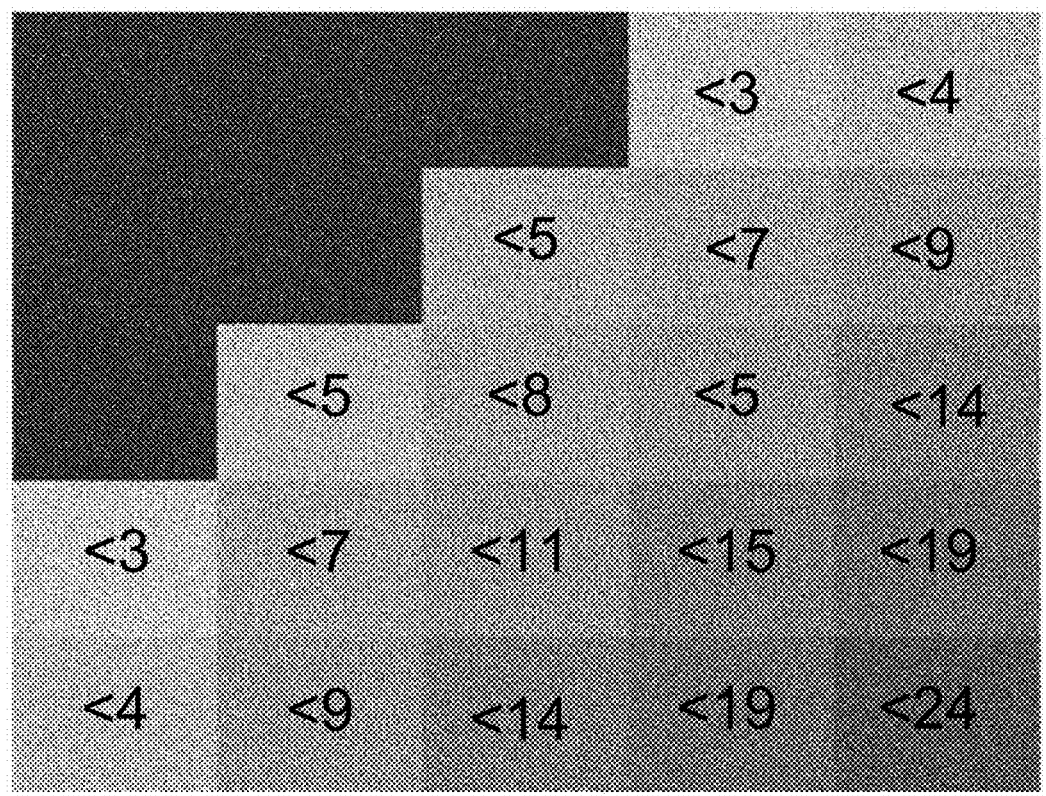
FIG. 7 is a diagram depicting an embodiment of the identification process in accordance with an embodiment of the present disclosure.

Referring now to FIG. 7, another embodiment consistent with identification process 10 is provided. In some embodiments, this operation may follow that described above in FIG. 6. In this example, an estimation of the number of elements in the 2-D array guaranteed to be smaller than the current element in that cell is performed. In this example, the count in each cell may represent the number of elements guaranteed to be smaller than the element in that cell itself. Again, note that the column sorting does not destroy the sorting order along the row.

Figure 8:
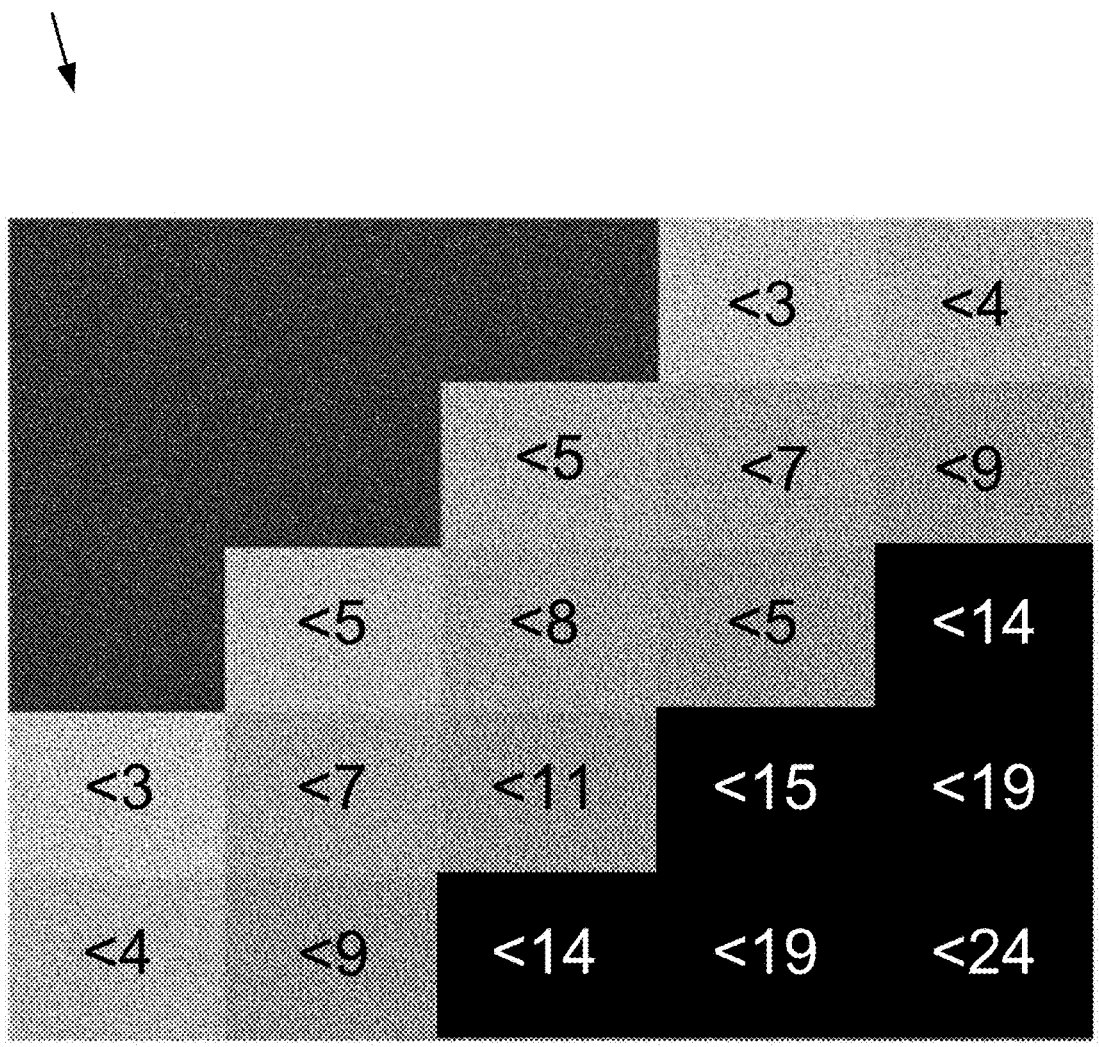
FIG. 8 is a diagram depicting an embodiment of the identification process in accordance with an embodiment of the present disclosure.

Referring now to FIG. 8, another embodiment consistent with identification process 10 is provided. In some embodiments, this operation may follow that described above in FIG. 7. In this example, an elimination based on the number of elements less than the current element is performed. Similar to FIG. 6, for a 5×5 median, the elements that include 13 or more elements less than it can not be the median. In other words, this operation allows for the elimination of non-median candidates, e.g., the elements having 13 or more elements less than it. Note, that since the number of eliminated median candidates are equal on both sides, the median of remaining elements is the median of the entire set.

Figure 9:
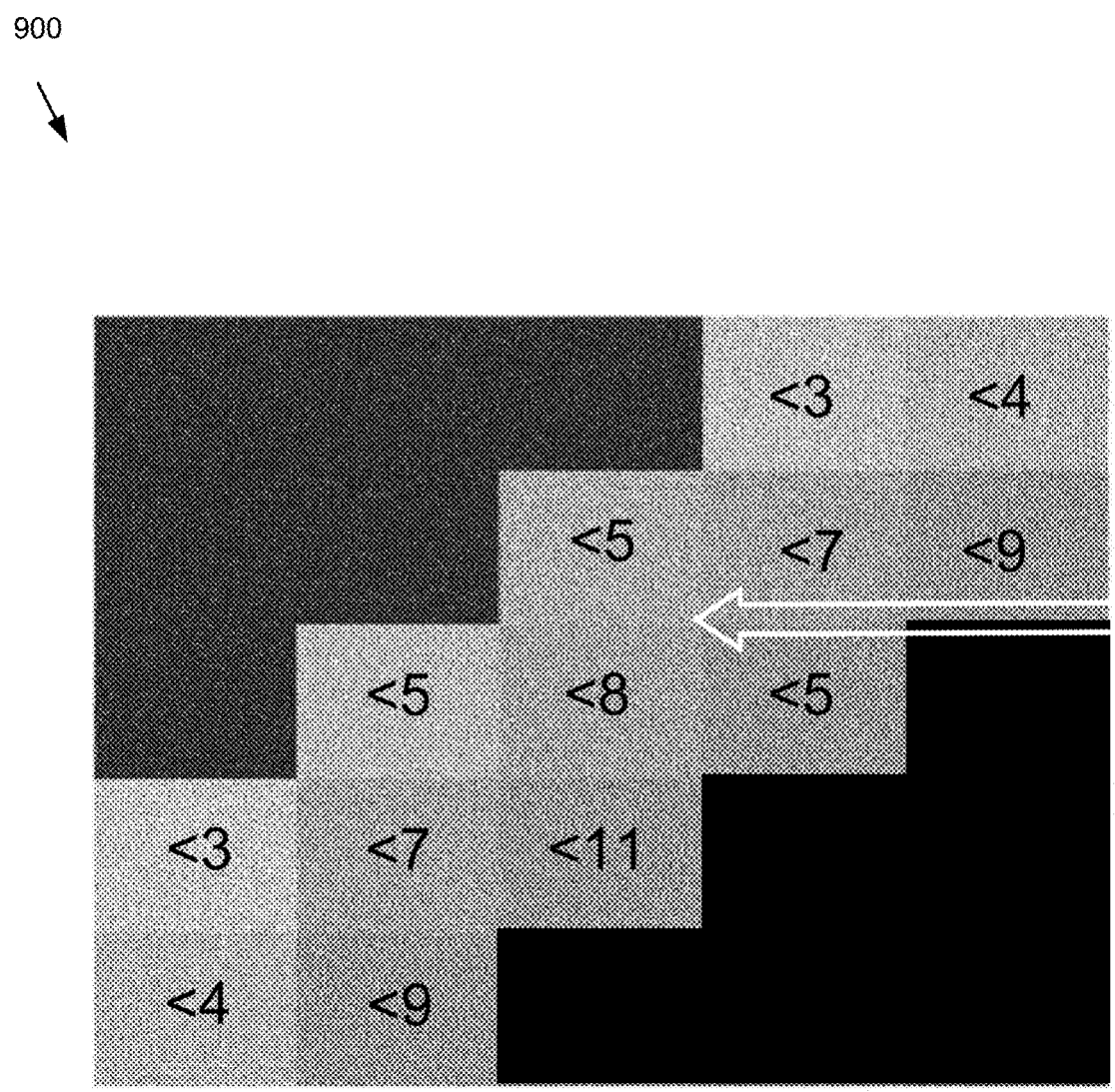
FIG. 9 is a diagram depicting an embodiment of the identification process in accordance with an embodiment of the present disclosure.

Referring now to FIG. 9, another embodiment consistent with identification process 10 is provided. In some embodiments, this operation may follow that described above in FIG. 8. In this example, a partial sorting of columns (e.g., a direction other than used in the full sorting step) to form active diagonals containing potential median candidates is performed. For identifying the remaining median candidates, only a few elements from the fully sorted columns may be needed. Hence, these elements may be found by partial sorting of columns.

Figure 10:
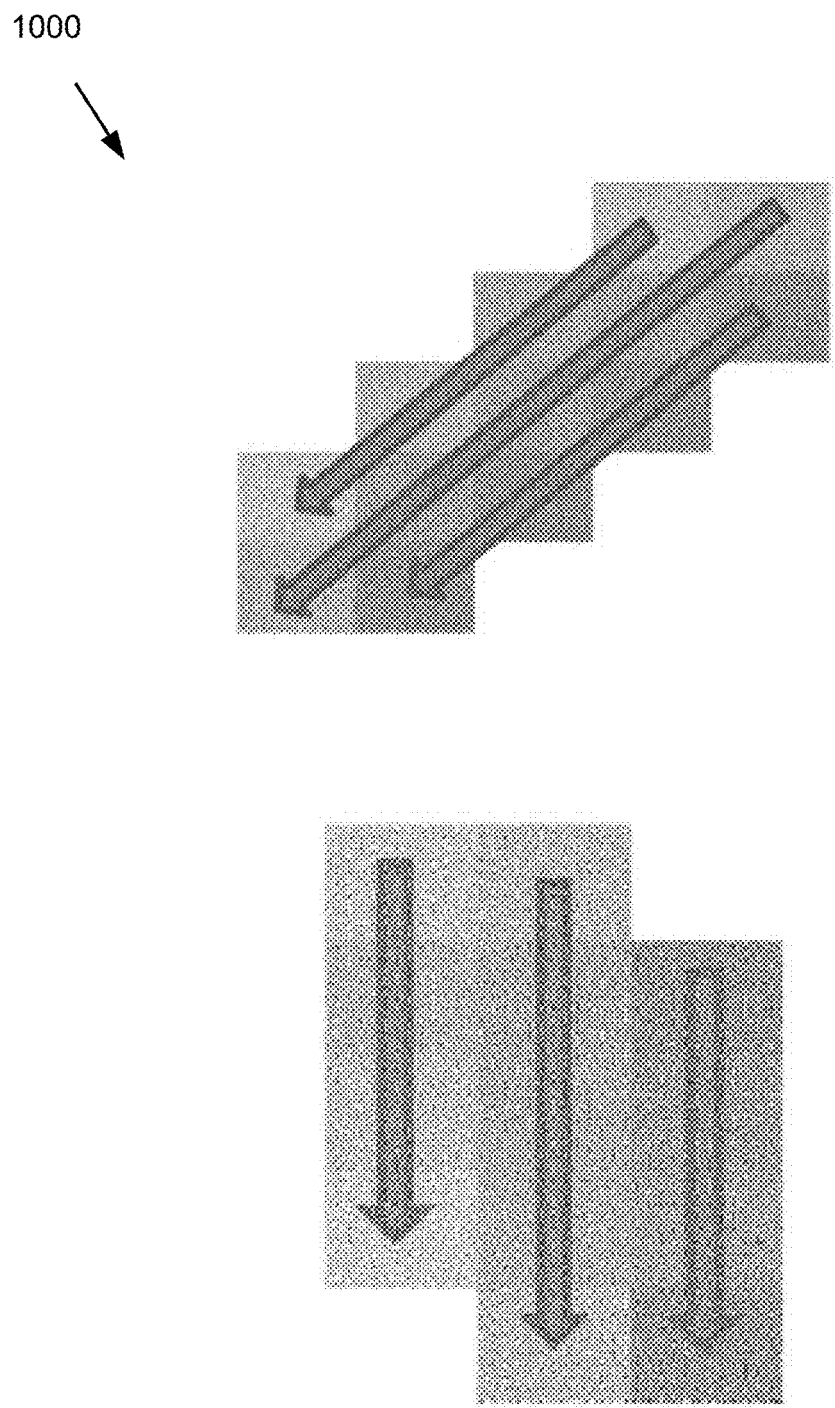
FIG. 10 is a diagram depicting an embodiment of the identification process in accordance with an embodiment of the present disclosure.

Referring now to FIG. 10, another embodiment consistent with identification process 10 is provided. In some embodiments, this operation may follow that described above in FIG. 9. In this example, a rearrangement of diagonal elements in the remaining median candidates into columns may be performed such that the row sorting is preserved. The rows are slid in a horizontal direction such that the diagonal elements fall in the same column after sliding the subsequent rows. The slid amount of the rows is monotonically increased by 1 in the downward direction. Note that by sliding rows in horizontal direction the diagonals may be arranged as columns and the row sorting order is not destroyed.

Figure 11:
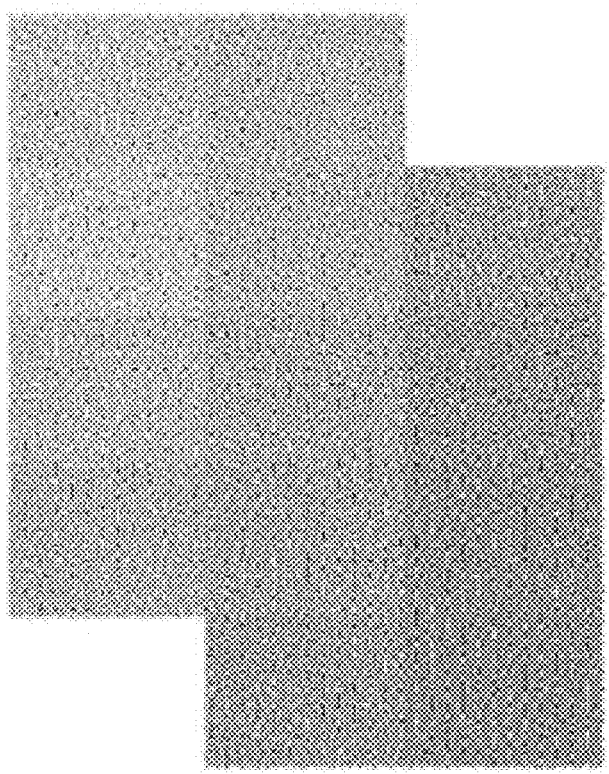
FIG. 11 is a diagram depicting an embodiment of the identification process in accordance with an embodiment of the present disclosure.

Referring now to FIG. 11, another embodiment consistent with identification process 10 is provided. In some embodiments, this operation may follow that described above in FIG. 10. In this example, the columns (1-D arrays) of the rearranged array in FIG. 10 are virtually sorted. Similar to FIG. 4, this representation may be a temporary representation for identifying non-median elements only. For actual median calculations, the full column sorting as shown in this operation is not required. Again, note that the column sorting does not destroy the sorting order along the row.

Figure 12:
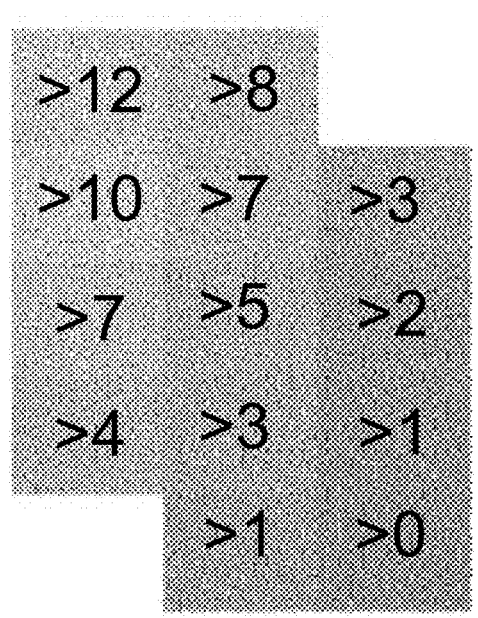
FIG. 12 is a diagram depicting an embodiment of the identification process in accordance with an embodiment of the present disclosure.

Referring now to FIG. 12, another embodiment consistent with identification process 10 is provided. In some embodiments, this operation may follow that described above in FIG. 11. In this example, which may be similar to FIG. 5, an estimation of the number of elements (in the remaining median candidates) guaranteed to be greater than the current element is performed. Again, note that the column sorting does not destroy the sorting order along the row.

Figure 13:
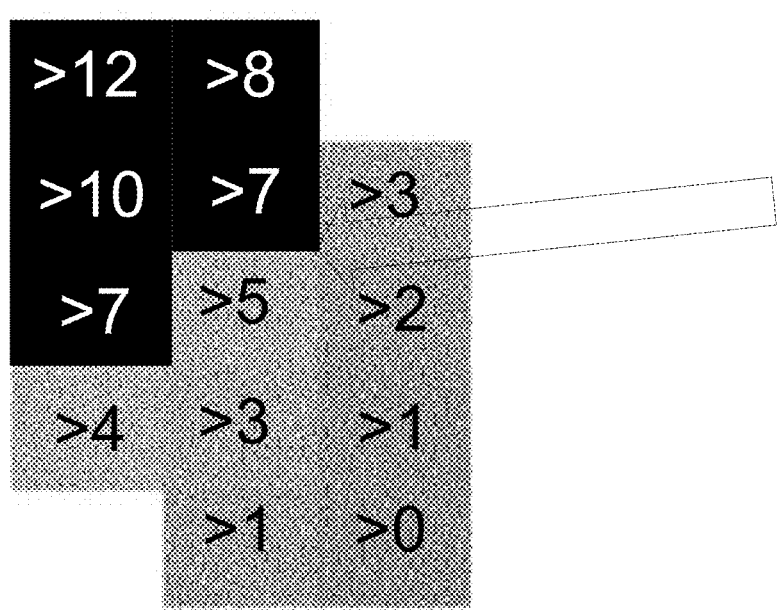
FIG. 13 is a diagram depicting an embodiment of the identification process in accordance with an embodiment of the present disclosure.

Referring now to FIG. 13, another embodiment consistent with identification process 10 is provided. In some embodiments, this operation may follow that described above in FIG. 12. In this example, which may be similar to FIG. 6, an elimination of non-median candidates is performed. Since there are 13 remaining median candidates, 6 elements have to be greater than the true median, so elements which have 7 or more elements greater than it can not be the median. Elimination of non-median candidates, e.g., the elements having 7 or more elements greater than it may be performed.

Figure 14:
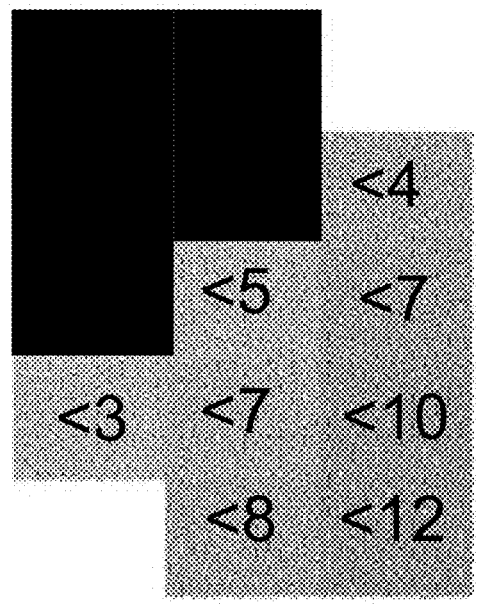
FIG. 14 is a diagram depicting an embodiment of the identification process in accordance with an embodiment of the present disclosure.

Referring now to FIG. 14, another embodiment consistent with identification process 10 is provided. In some embodiments, this operation may follow that described above in FIG. 13. In this example, which may be similar to FIG. 7, after elimination based on the number of smaller elements, the estimation of the number of elements guaranteed to be less than the current element in the median candidates array is performed. Again, note that the column sorting does not destroy the sorting order along the row.

Figure 15:
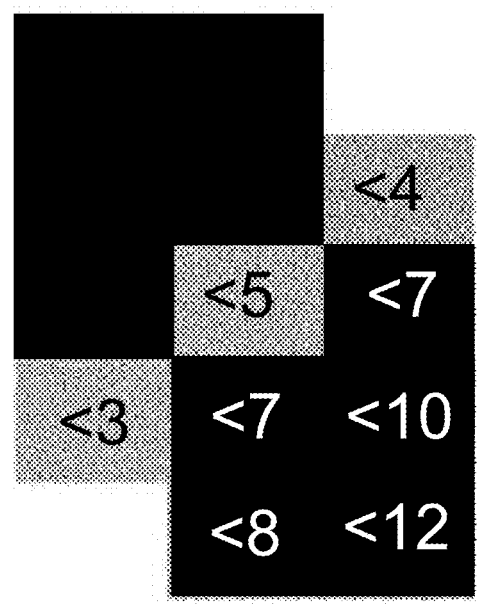
FIG. 15 is a diagram depicting an embodiment of the identification process in accordance with an embodiment of the present disclosure.

Referring now to FIG. 15, another embodiment consistent with identification process 10 is provided. In some embodiments, this operation may follow that described above in FIG. 14. In this example, which may be similar to FIG. 8, an elimination based on the number of elements less than the current element may be performed. Here, the remaining 13 median candidates, the elements which have 7 or more elements less than it can not be the median. Note, similar to FIG. 10, that the diagonals may be arranged as columns, such that the row sorting order is not destroyed (e.g., row has only 1 element here). Accordingly, the remaining median candidates could be found by partial sorting of columns.

Referring now to FIG. 16, another embodiment consistent with identification process 10 is provided. In some embodiments, this operation may follow that described above in FIG. 15. In this example, the diagonals may be arranged as columns, such that the row sorting order is not destroyed (e.g., row length is 1 here). The median of the remaining three median candidates is the median of the entire 2-D array.

In some embodiments, orthogonal-direction sorting invariant (ODSI) structures may be employed. In this way, the both ways sorted (e.g., rows, columns, major) 2-D structure must be achieved by sorting the rows and columns only once. Accordingly, sorting in one dimension (e.g. columns) must preserve the pre-done sorting in the orthogonal dimension (e.g., rows). This type of structure is referred to herein as an "Orthogonal-Direction Sorting Invariant" (OD SI) Structures.

In some embodiments, identification process 10 may be configured to handle various different types of structures. For example, in some cases there may be two kinds of structures that the process encounters, an initial two dimensional structure (only at the beginning), which may include only sorted rows and one or more intermediate structures, which may be formed by Verticalizing Diagonals after eliminating non-candidates. These are always formed in subsequent elimination and diagonal verticalization iterations. The above structures have different properties e.g., initial 2-D structure may have only 1 element smaller in left column but interim structure may have up to 2 elements smaller in left column. And hence these structures need separate considerations for checking and converting them into ODSI Structures. The difference in properties in these structures that lead to separate ODSI considerations are described in further detail hereinbelow.

Figure 17A:
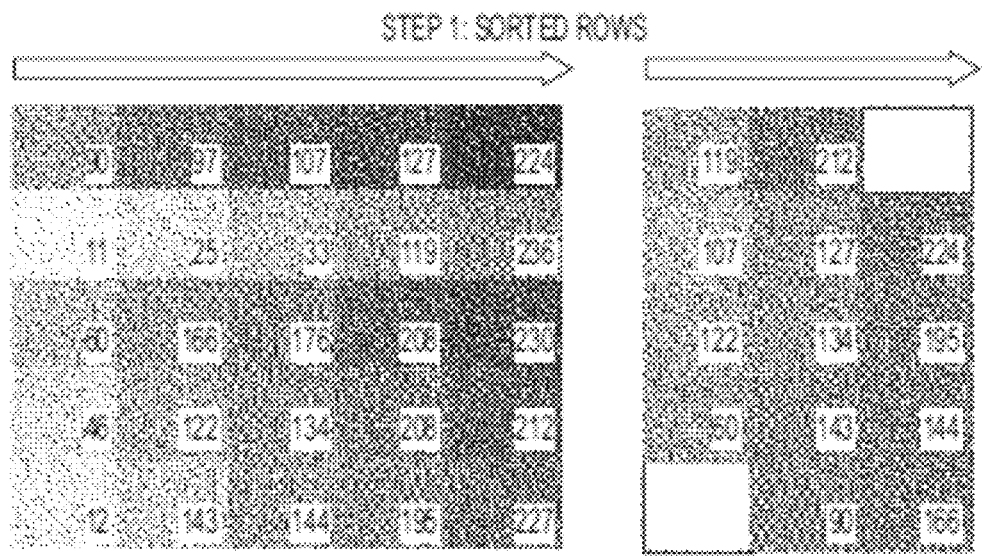
FIG. 17A is a diagram depicting an embodiment of the identification process in accordance with an embodiment of the present disclosure.
Figure 17B:
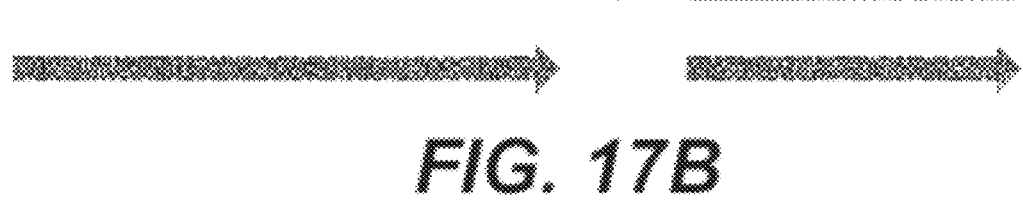
FIG. 17B is a diagram depicting an embodiment of the identification process in accordance with an embodiment of the present disclosure.

Referring now to FIGS. 17A-17B, another embodiment consistent with identification process 10 is provided. In some embodiments, both structures in a 5×5 median computation may be ODSI structures. The diagram on the top depicts the sorting of rows in a first step and the diagram on the bottom depicts the sorting of columns in a second step. It should be noted that the values in cells are actual numbers. Also, row sorting is still preserved after columns are sorted. So both structures in 5×5 median computation are ODSI structures.

Figure 18:
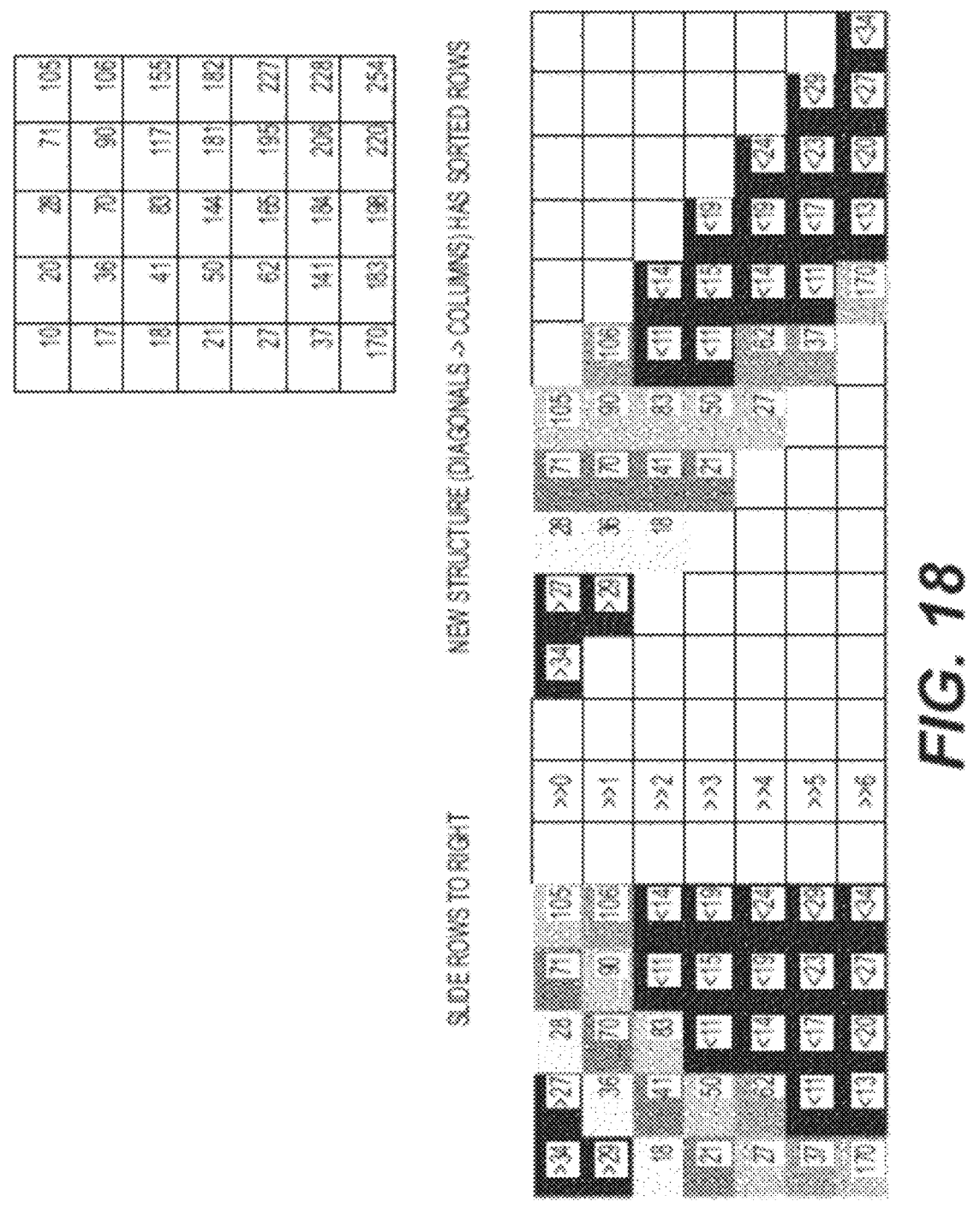

Referring now to FIG. 18, another embodiment consistent with identification process 10 is provided. In some embodiments, identification process 10 may be configured to handle an nth Min/Max in a 2-D Array. For example, in a 10th min of 7 (rows)×5 (columns) array. In this example, an input array with rows and columns sorted is provided. For 10th_Min, 9 elements (Smaller)<10th_Min<25 elements (Higher). In this example, the elimination criterion may include 10+ Smaller or 26+ Higher elements. The operations may include sliding rows to the right and the new Structure (diagonals→columns) may include sorted rows. Note that the row slid amount is monotonically increasing by 1 in downward direction.

Figures 19A, 19B, 19C:
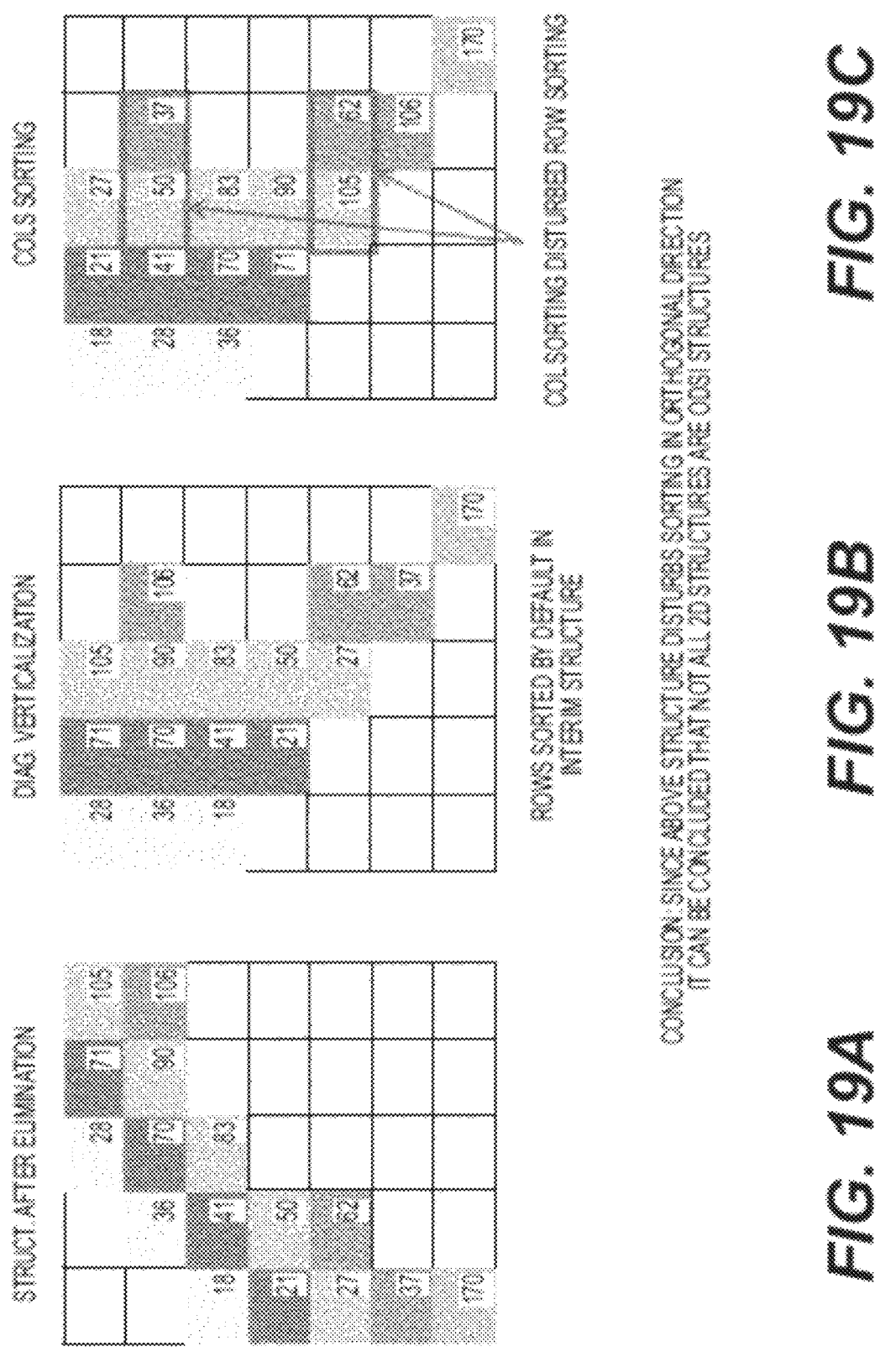

Referring now to FIGS. 19A-19C, another embodiment consistent with identification process 10 is provided. In some embodiments, the diagrams of FIG. 19 depict the structure after elimination, diagonal verticalization i.e. diagonal elements form column by sliding rows (rows sorted by default in interim structure), and column sorting (column sorting disturbed row sorting) respectively. In this example, since the structure disturbs sorting in orthogonal direction it can be concluded that not all two dimensional structures are ODSI structures.

Figure 20B:
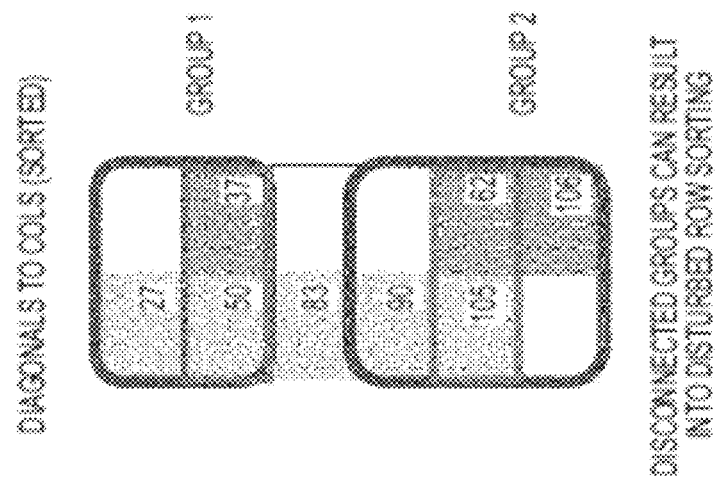
FIG. 20B is a diagram depicting an embodiment of the identification process in accordance with an embodiment of the present disclosure.
Figure 20A:
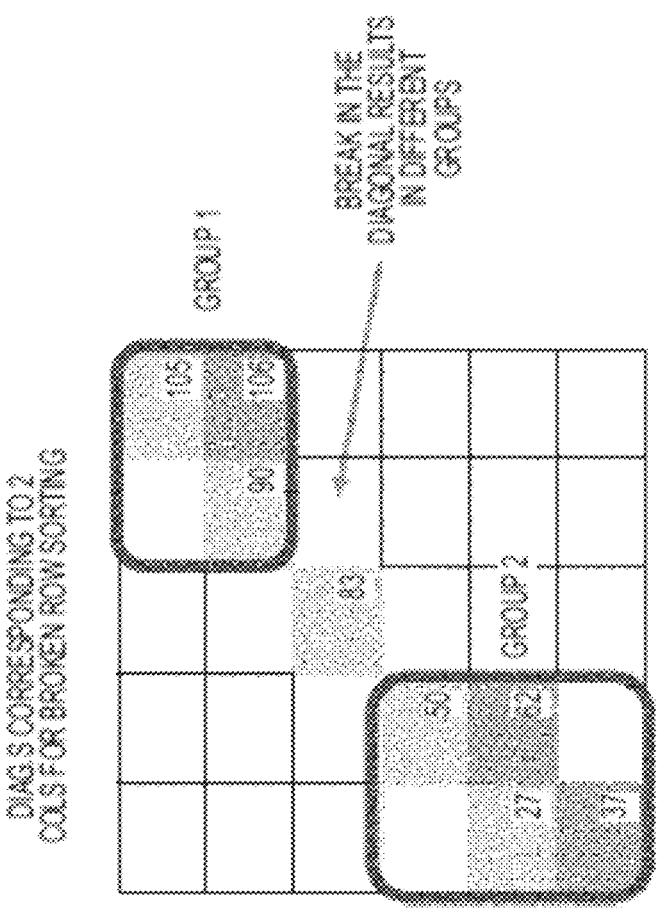
FIG. 20A is a diagram depicting an embodiment of the identification process in accordance with an embodiment of the present disclosure.

Referring now to FIGS. 20A-20B, another embodiment consistent with identification process 10 is provided. In some embodiments, the intermediate two dimensional structure is not ODSI. In this example, consider the diagonals which correspond to the 2 columns where row sorting got disturbed after column sorting. There are disconnected group of elements in these 2 diagonals and the corresponding columns after verticalization. The disconnected groups may cause the row sorting getting disturbed after column sorting.

Figure 21B:
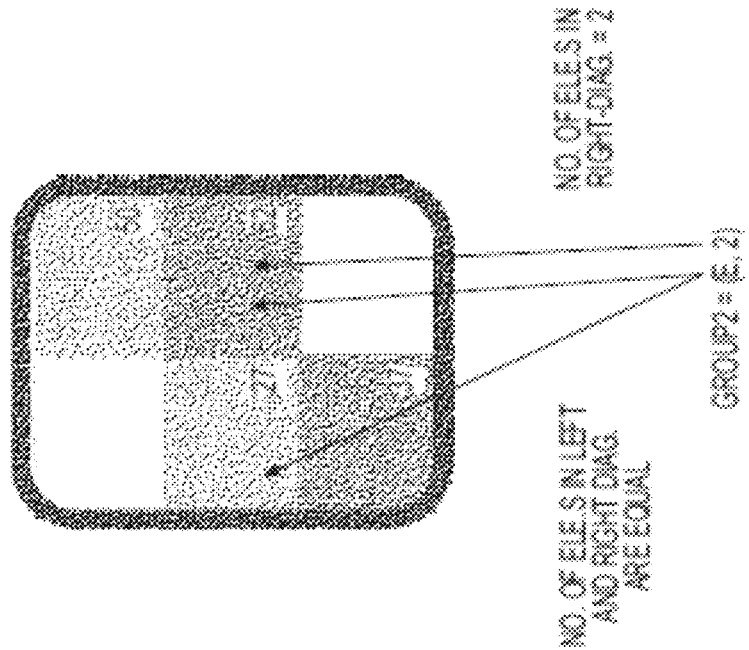
FIG. 21B is a diagram depicting an embodiment of the identification process in accordance with an embodiment of the present disclosure.
Figure 21A:
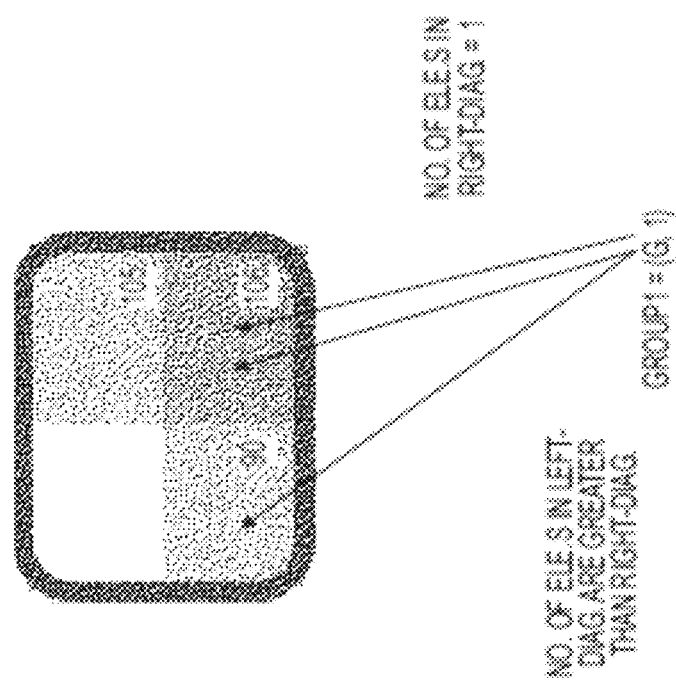
FIG. 21A is a diagram depicting an embodiment of the identification process in accordance with an embodiment of the present disclosure.

Referring now to FIGS. 21A-21B, another embodiment consistent with identification process 10 is provided. In some embodiments, identification process 10 may be configured to convert one or more interim two dimensional structures into ODSI structures. An interim two dimensional structure can be modified to convert it into ODSI structure. The connected group of elements need to be properly ordered to form an ODSI structure. There are three types of groups identified as a pair attributes. These attributes may include an alphabet specifying if the number of elements in left diagonal/column are Smaller(S), Equal(E) or Greater(G) than the number of elements in right-diagonal/column and also the total number of elements in the right diagonal/column.

Figure 22:
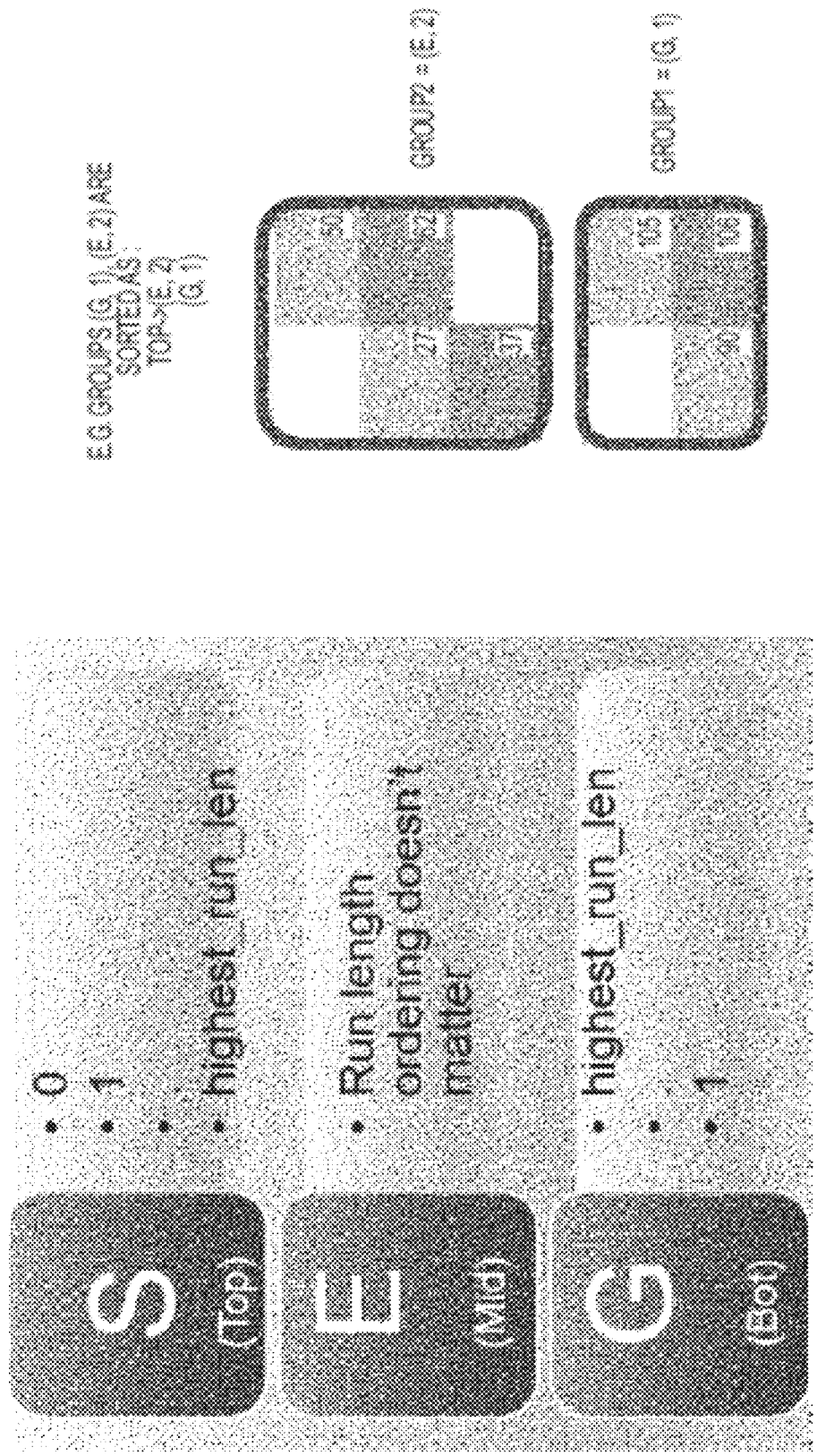
FIG. 22 is a diagram depicting an embodiment of the identification process in accordance with an embodiment of the present disclosure.

Referring now to FIG. 22, another embodiment consistent with identification process 10 is provided. In some embodiments, converting one or more interim two dimensional structures into ODSI structures may include, once the order pairs of (S|E|G, run_len) are formed for all groups, where, S|E|G=number of elements in left diagonal are Smaller|Equal|Greater than number of elements in right diagonal. run_len=number of elements in right diagonal. The process may include arranging the groups from Top to Bottom as "S_increasingRun to G_decreasingRun".

Figure 23:
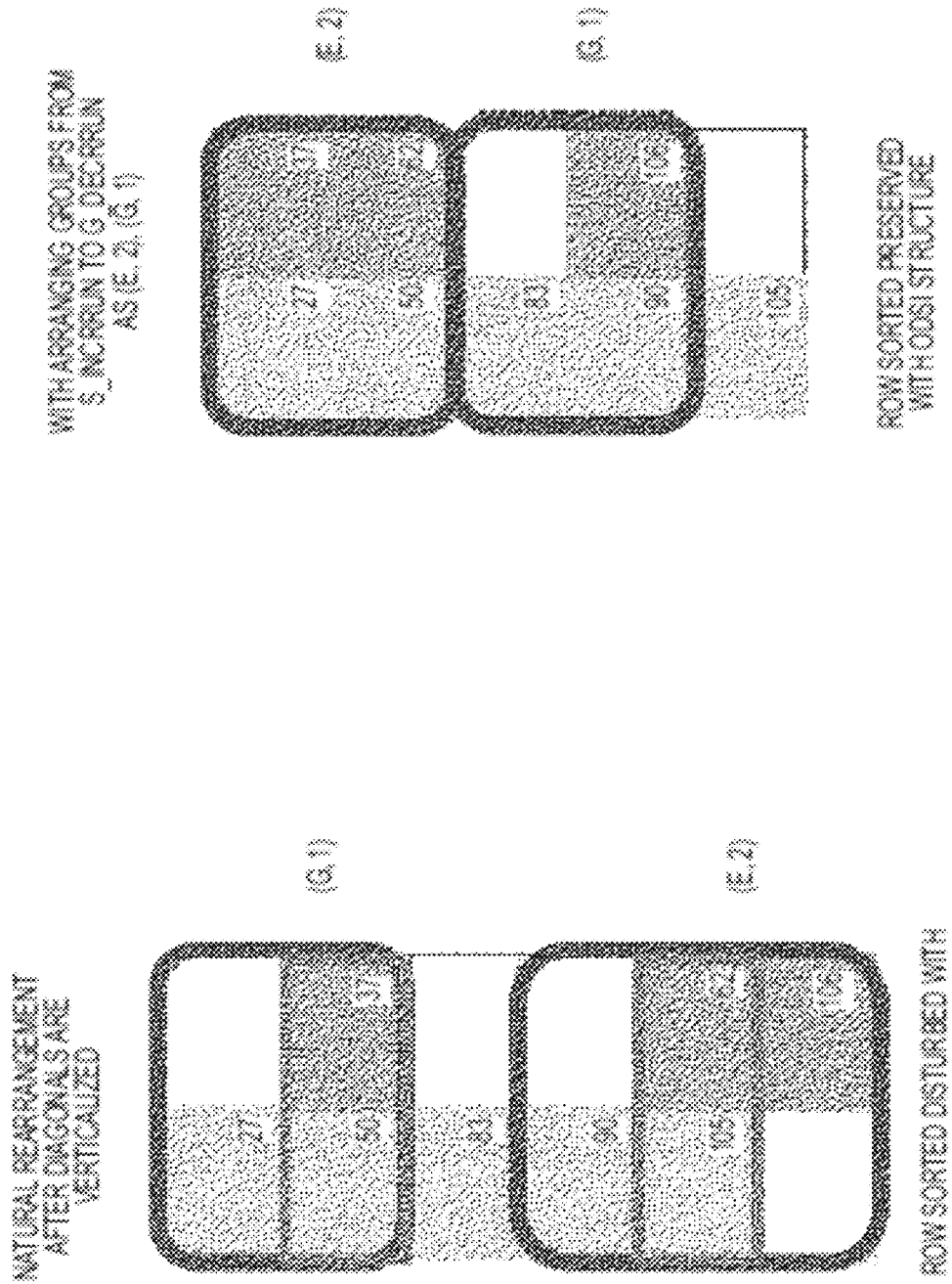
FIG. 23A is a diagram depicting an embodiment of the identification process in accordance with an embodiment of the present disclosure.
FIG. 23B is a diagram depicting an embodiment of the identification process in accordance with an embodiment of the present disclosure.

Referring now to FIGS. 23A-23B, another embodiment consistent with identification process 10 is provided. In this particular example, identification process 10 may be used to apply interim ODSI structure rules to a 10th min example. As shown in FIG. 23, the process may be configured to convert the default structure after row sliding to an ODSI structure by arranging the group from S_increasingRun to G_decreasingRun. The disturbed row sorting may be corrected in a new structure. Note that the disconnected element in left column gets pushed to bottom after rearrangement to ODSI.

Figure 24:
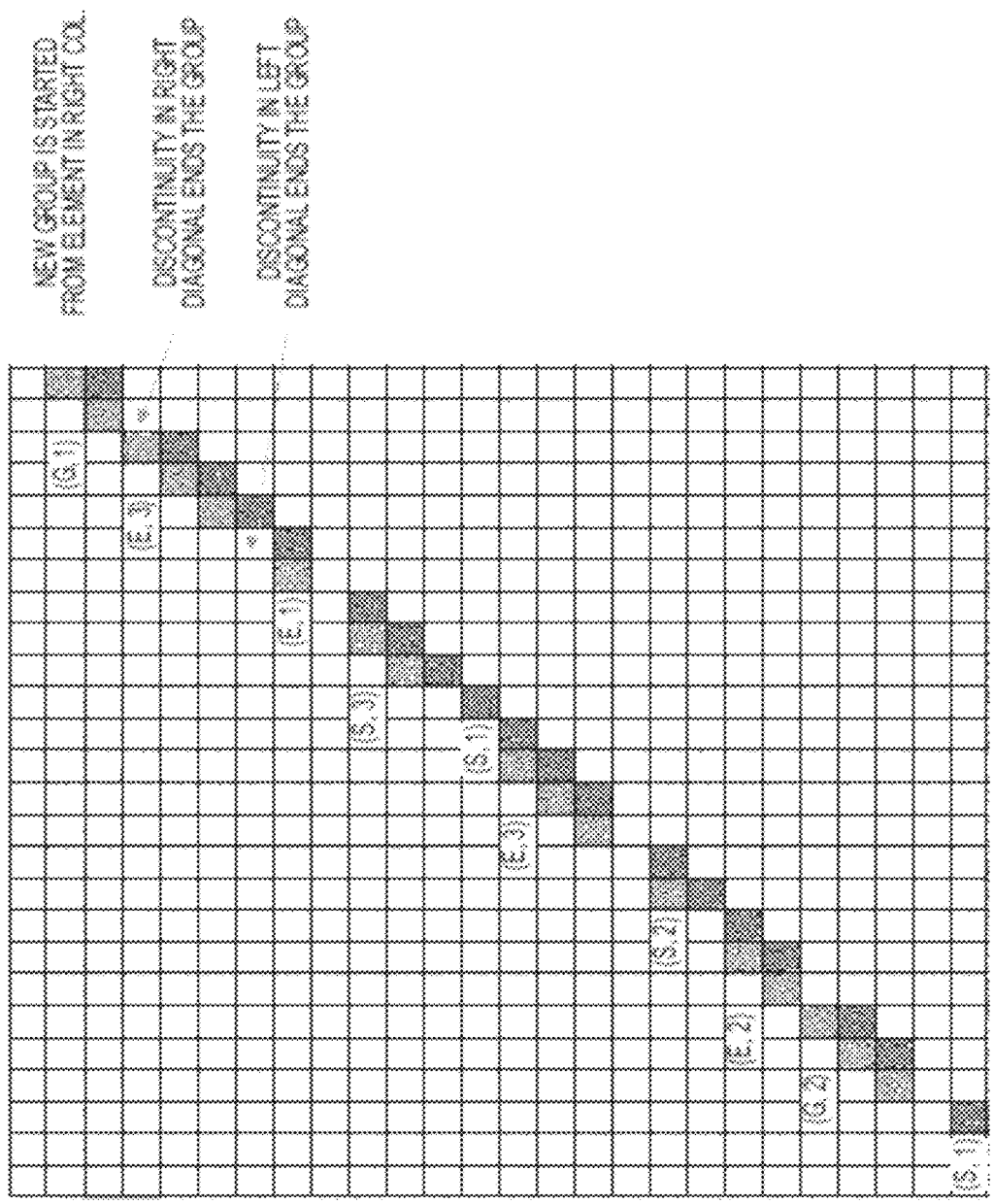
FIG. 24 is a diagram depicting an embodiment of the identification process in accordance with an embodiment of the present disclosure.
Figure 25:
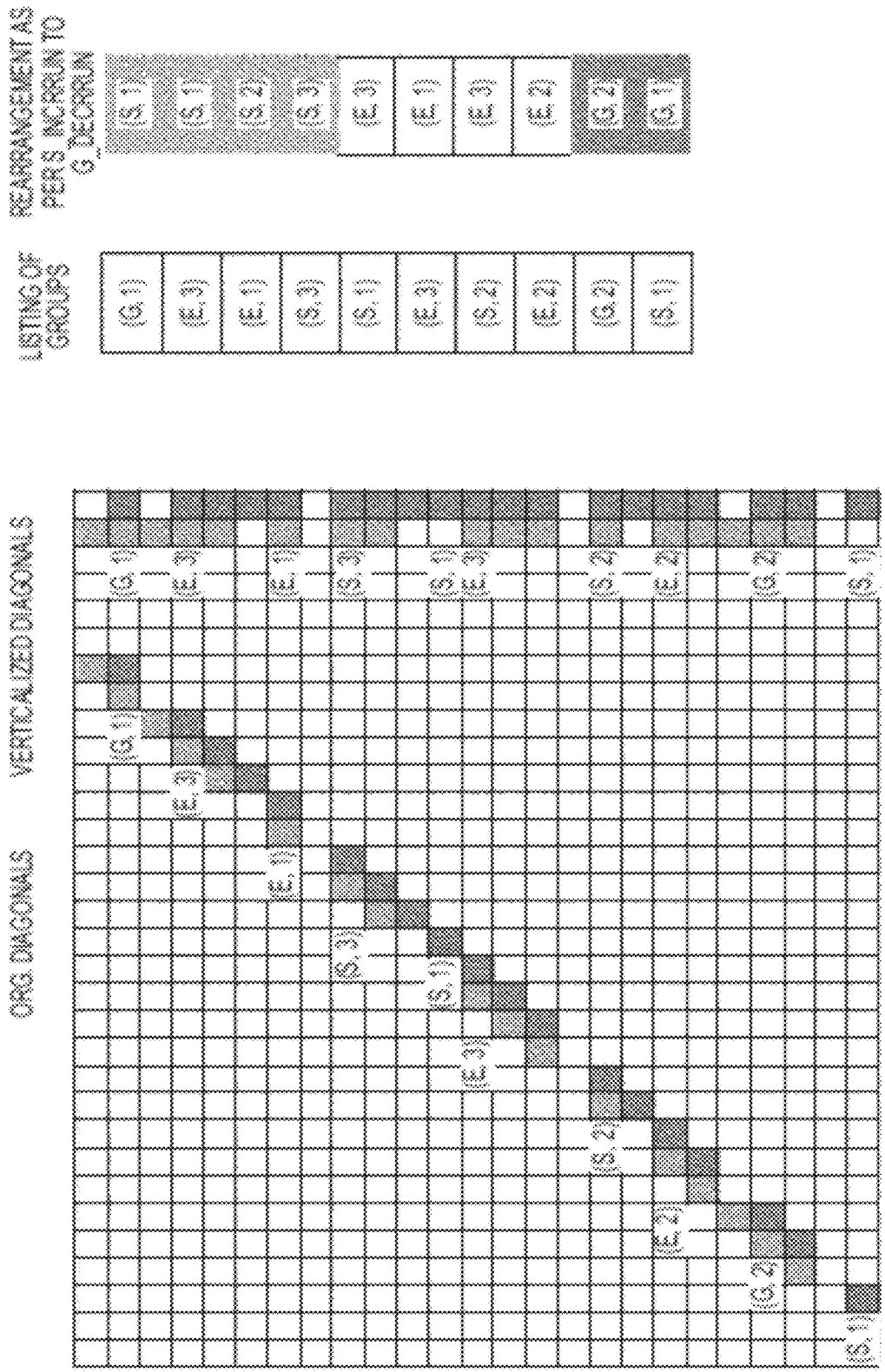
FIG. 25 is a diagram depicting an embodiment of the identification process in accordance with an embodiment of the present disclosure.

Referring now to FIGS. 24-26, another embodiment consistent with identification process 10 is provided. In this particular embodiment, an exhaustive example of interim structure grouping and rearranging is provided. More specifically, an example structure of diagonals in a two dimensional structure after elimination is shown followed by steps for converting verticalized diagonal structure into most-optimized intermediate ODSI structure.

Figure 27:
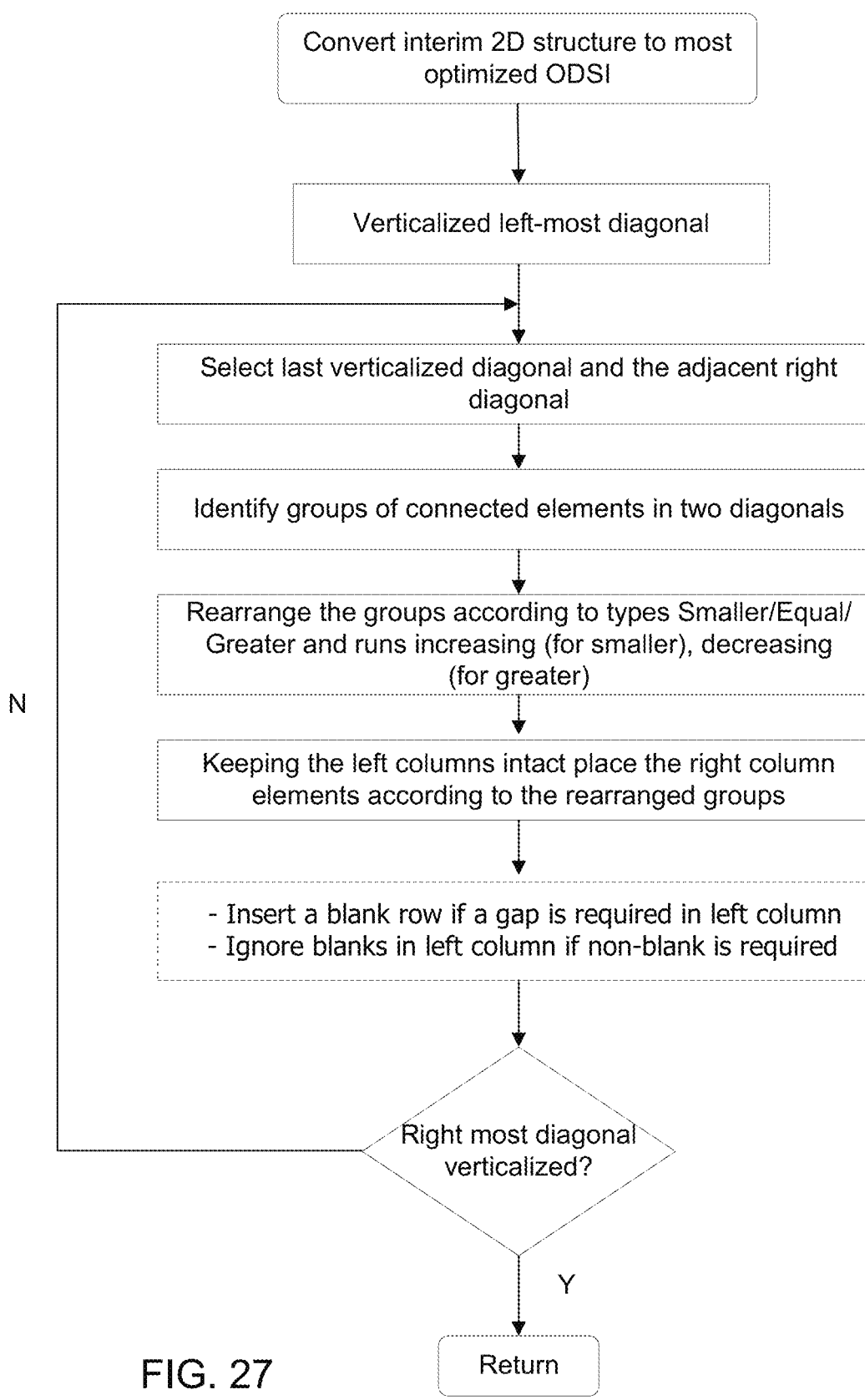
FIG. 27 is a diagram depicting an embodiment of the identification process in accordance with an embodiment of the present disclosure.

Referring now to FIG. 27, another embodiment consistent with identification process 10 is provided. In this example, a flowchart for converting interim two dimensional structures to the most-optimized ODSI is provided.

Figure 28:
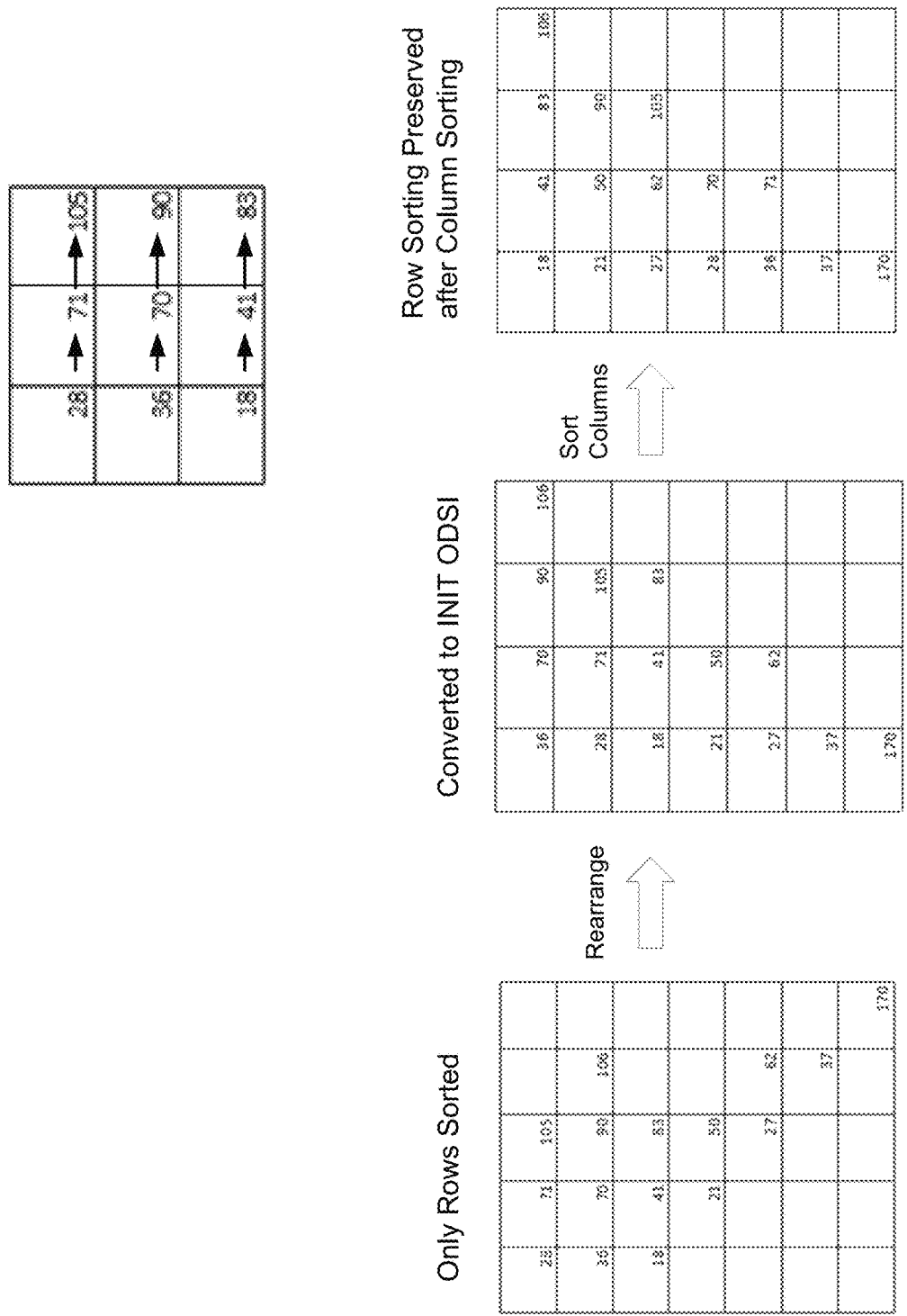
FIG. 28 is a diagram depicting an embodiment of the identification process in accordance with an embodiment of the present disclosure.
Figure 29:
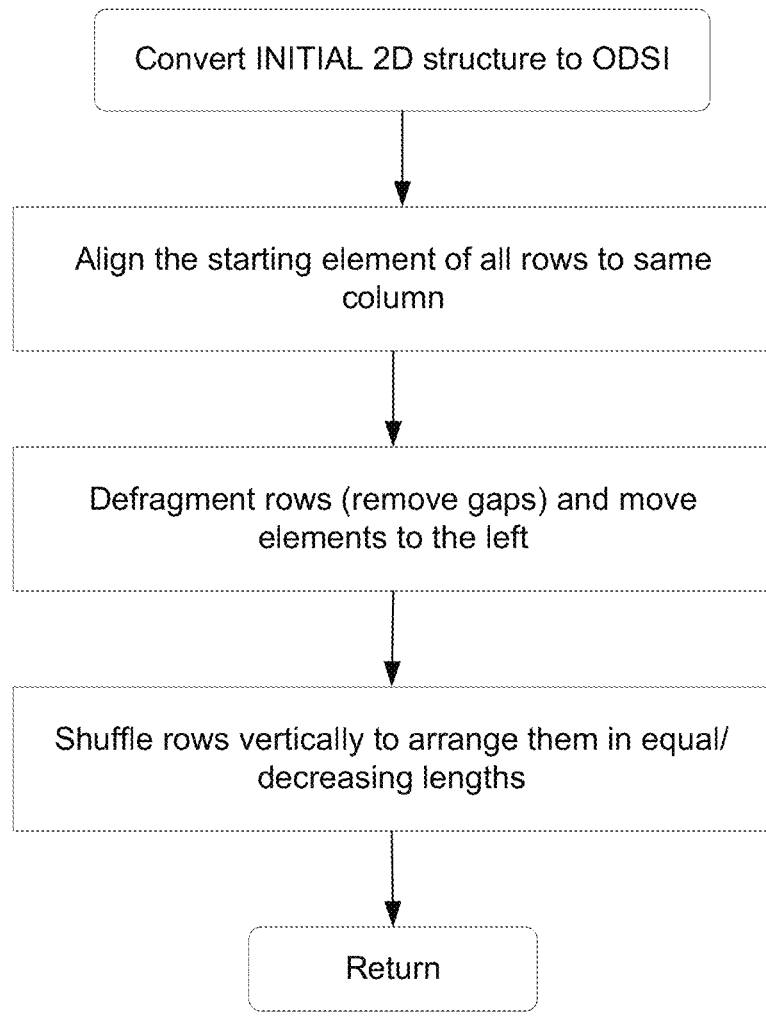
FIG. 29 is a diagram depicting an embodiment of the identification process in accordance with an embodiment of the present disclosure.

Referring now to FIGS. 28-29, another embodiment consistent with identification process 10 is provided. In this example, a flowchart for converting initial two dimensional structures to the ODSI is provided. In this particular example, the structure is considered to be INITIAL two dimensional structure which has only 1-way relation information (i.e. only 1 element smaller in left column). An example may include structures with only rows sorted. In some embodiments, one-way relation information means for an element there may be information about only element higher/lower than it. Some rules may include that the rows must start from same column, a row should be defragmented (no gaps), and or that row lengths must be equal/decreasing (from top to bottom). An example is provided in FIG. 28.

In some embodiments, this elimination method may provide a number of efficiency advantages. INITIAL ODSI Structure may be as much close to a square as possible for highest efficiency. However, there are multiple ways of realizing intermediate ODSI structures. The formation of intermediate ODSI structures with the method in flowchart is of highest efficiency for it entirely preserves sorting information available in previous structures. There are other intermediate ODSI structures which have simpler rules of formation, but the resulting structure may lead to a loss of sorting information available in the previous state. The efficiency of the embodiments disclosed herein may depend on minimizing the loss of sorting information available in previous states. It is possible to preserve one-way relational information and form a conforming structure of decreasing row lengths. Preserving two-way relations in the intermediate structure may lead to the highest efficiency but the rules are complex (as described in the flowchart of FIG. 27).

In some embodiments, there are many intermediate ODSI structures possible that are unoptimized compared to the most-optimized structure described in flowchart of FIG. 27. Unoptimized intermediate ODSI structure may be formed using a variety of different techniques. For example, by removing gaps in the disconnected groups of verticalized diagonal structure by sliding rows to left (at max till left-most column) and/or defragmenting columns and sliding elements in column to the top or from a most-optimized ODSI structure, by doing any of the following modifications, namely, sliding rows to left (at max till left-most column) and/or defragmenting columns and sliding elements in column to the top. Additionally and/or alternatively, change a verticalized diagonal structure, by refactoring and treating it to be initial 2-D structure and converting it into an INITIAL ODSI structure. In some embodiments, refactoring may be performed by preserving row sorting using any suitable approach, some of which may include, but are not limited to, converting columns to rows, breaking bigger rows/cols into two or more smaller rows, etc. In some embodiments, upon refactoring the structure may be converted to ODSI using INITIAL ODSI structure rules. Refactoring the intermediate structure may lead to simpler rules but may also lead to higher efficiency loss compared to the most optimized ODSI structure approach.

Figure 30:
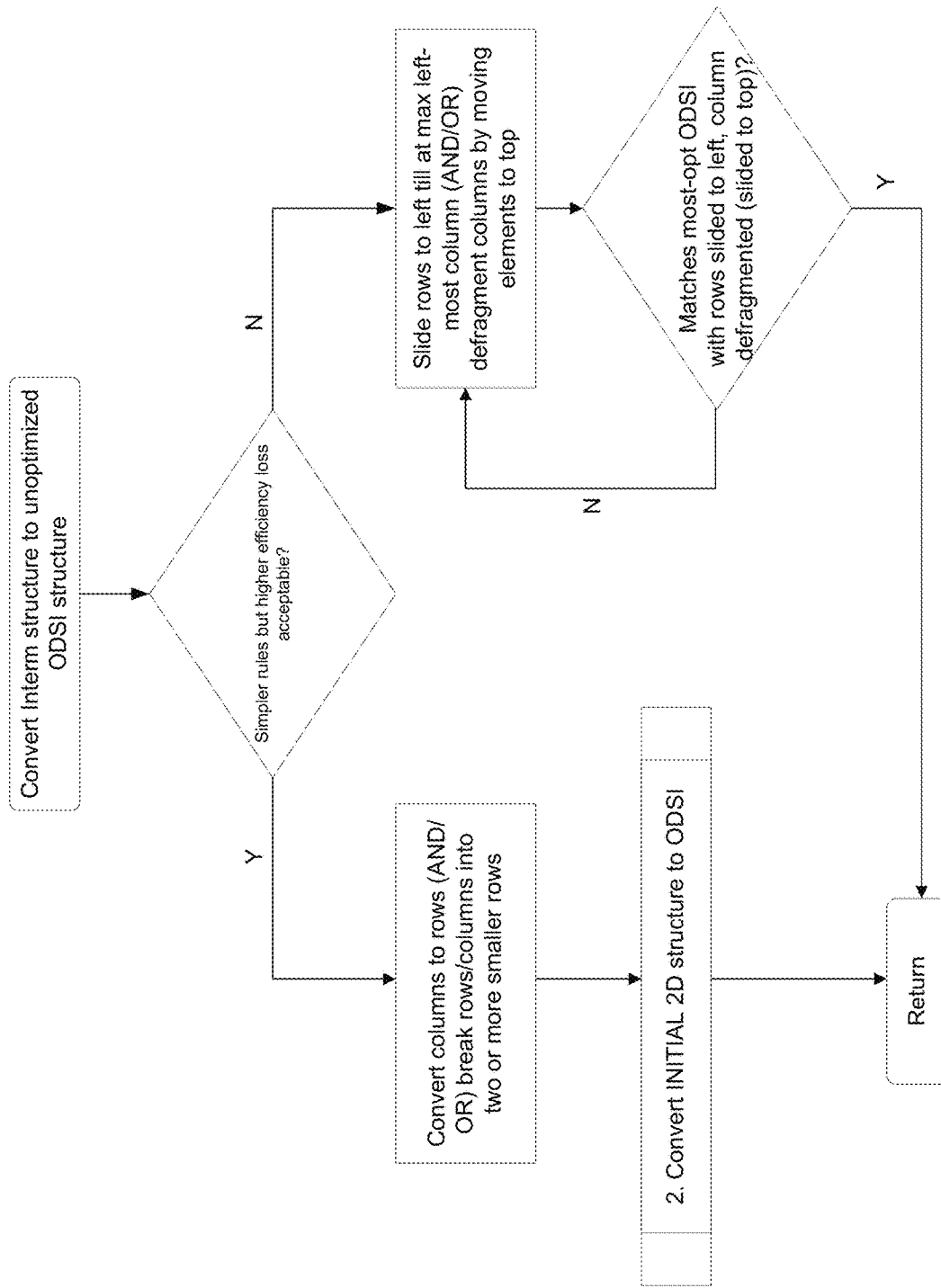
FIG. 30 is a diagram depicting an embodiment of the identification process in accordance with an embodiment of the present disclosure.

Referring now to FIG. 30, another embodiment consistent with identification process 10 is provided. In this example, a flowchart for converting interim structures to unoptimized ODSI structures is provided.

Figure 31:
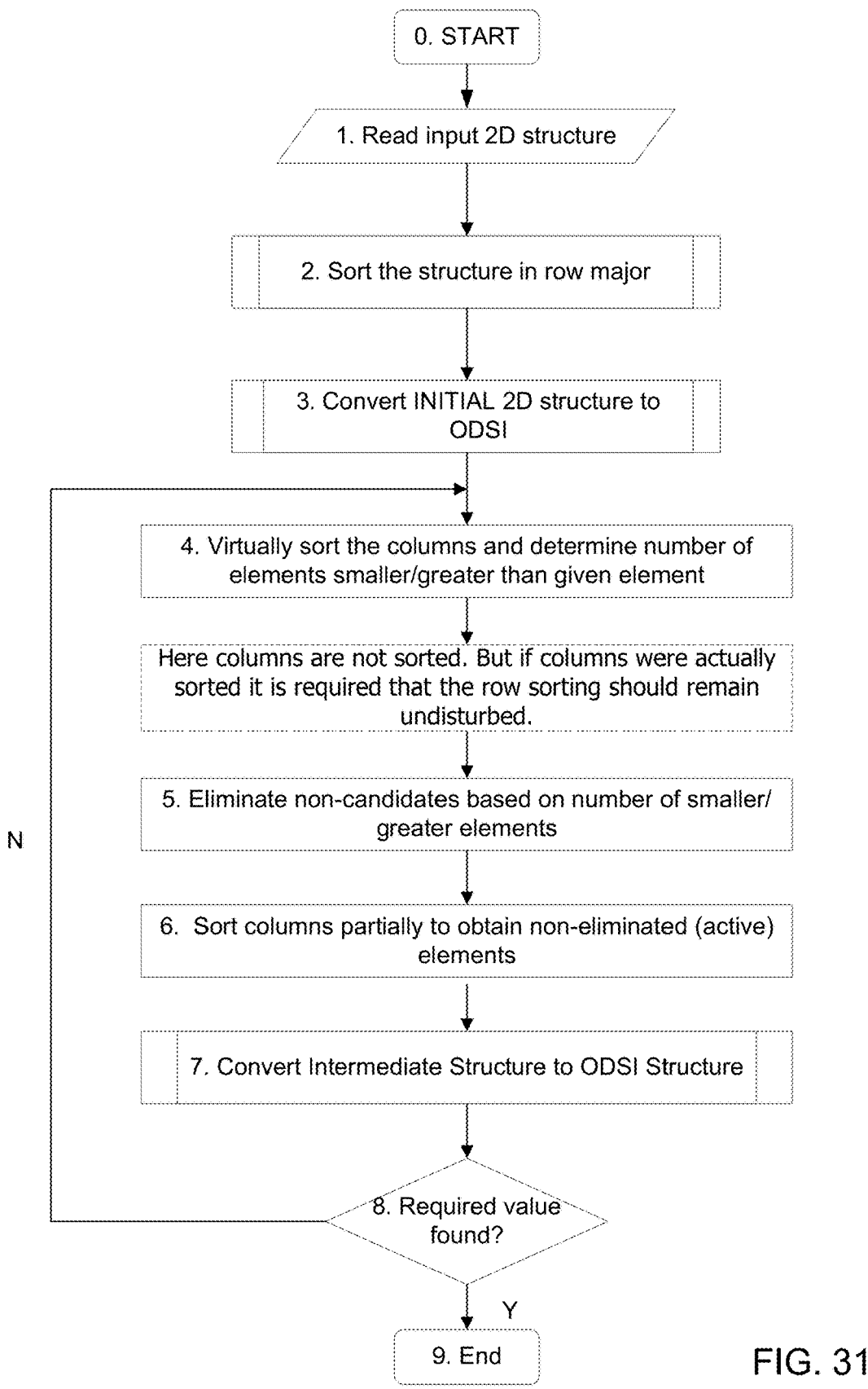
FIG. 31 is a diagram depicting an embodiment of the identification process in accordance with an embodiment of the present disclosure.

Referring now to FIG. 31, another embodiment consistent with identification process 10 is provided. In this example, a flowchart depicting an nth Min/Max Implementation is shown.

Figure 32:
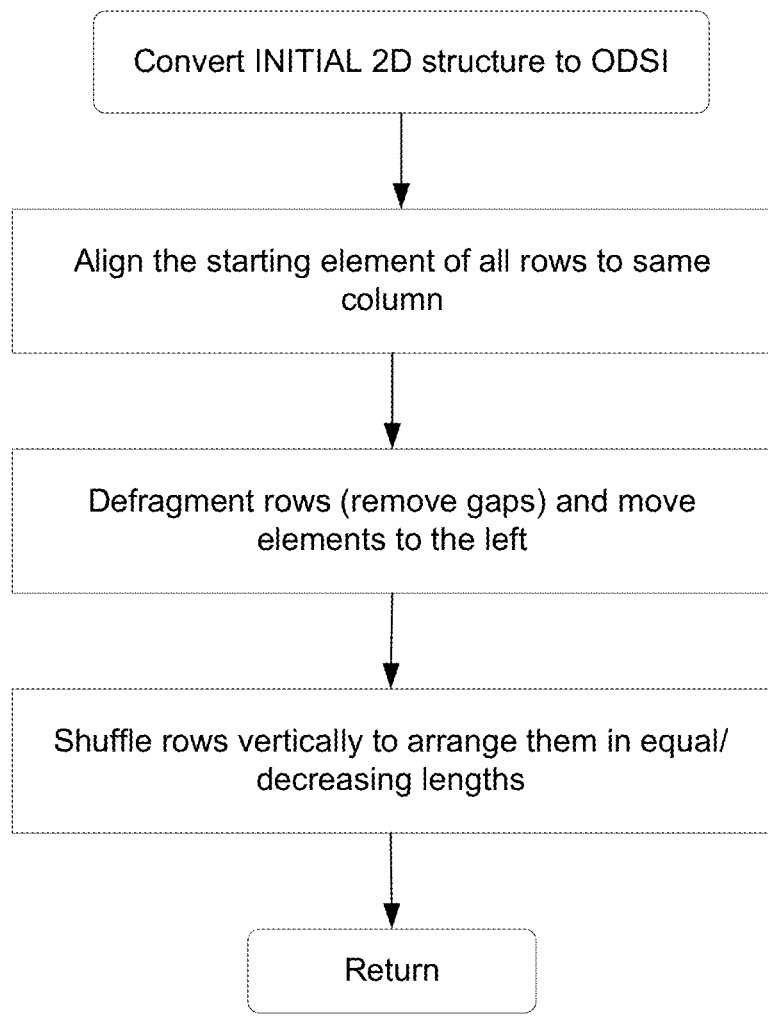
FIG. 32 is a diagram depicting an embodiment of the identification process in accordance with an embodiment of the present disclosure.

Referring now to FIG. 32, another embodiment consistent with identification process 10 is provided. In this example, a flowchart for converting INITIAL 2-D structures to ODSI is shown.

Figure 33:
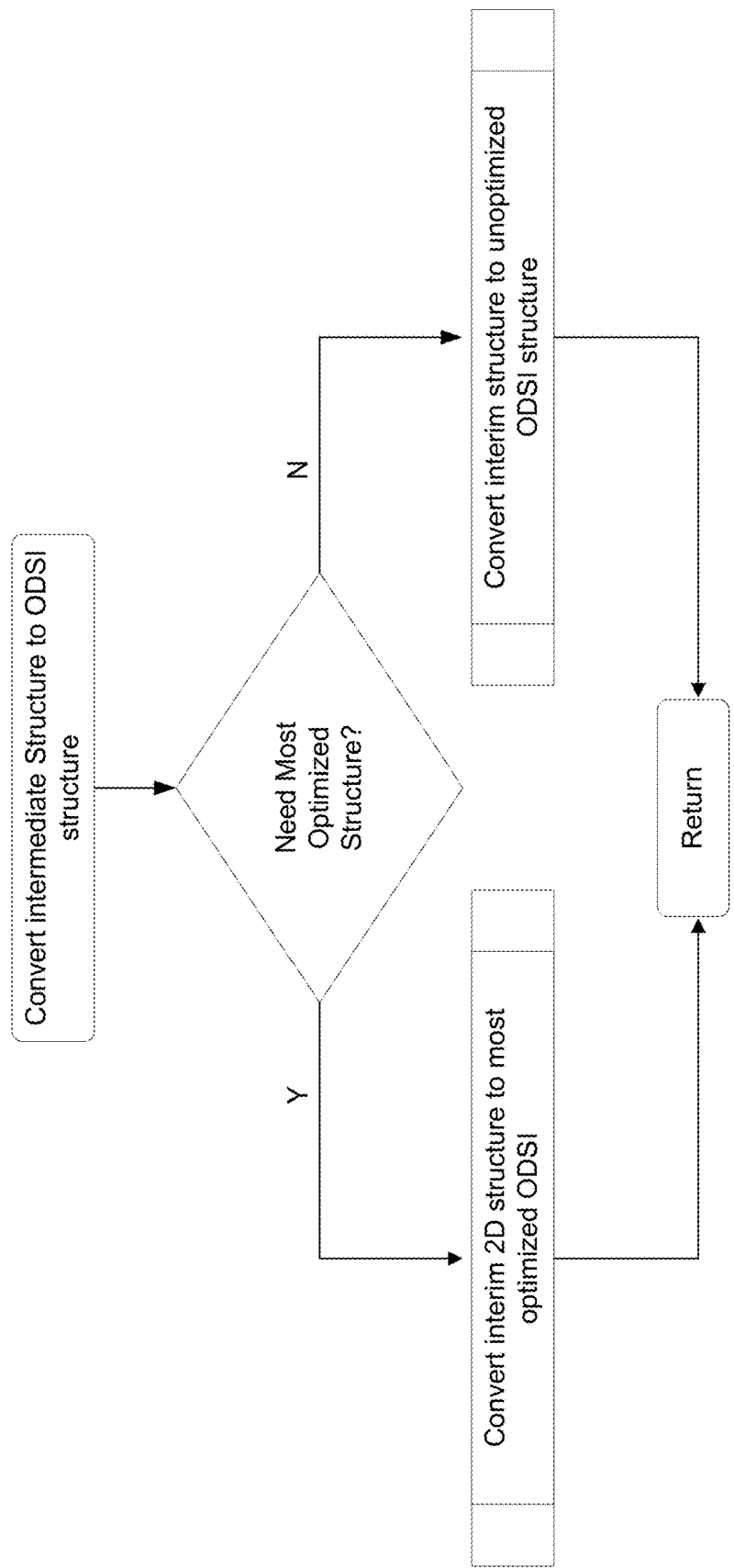
FIG. 33 is a diagram depicting an embodiment of the identification process in accordance with an embodiment of the present disclosure.

Referring now to FIG. 33, another embodiment consistent with identification process 10 is provided. In this example, a flowchart for converting interim structures to ODSI structures is shown.

Figure 34:
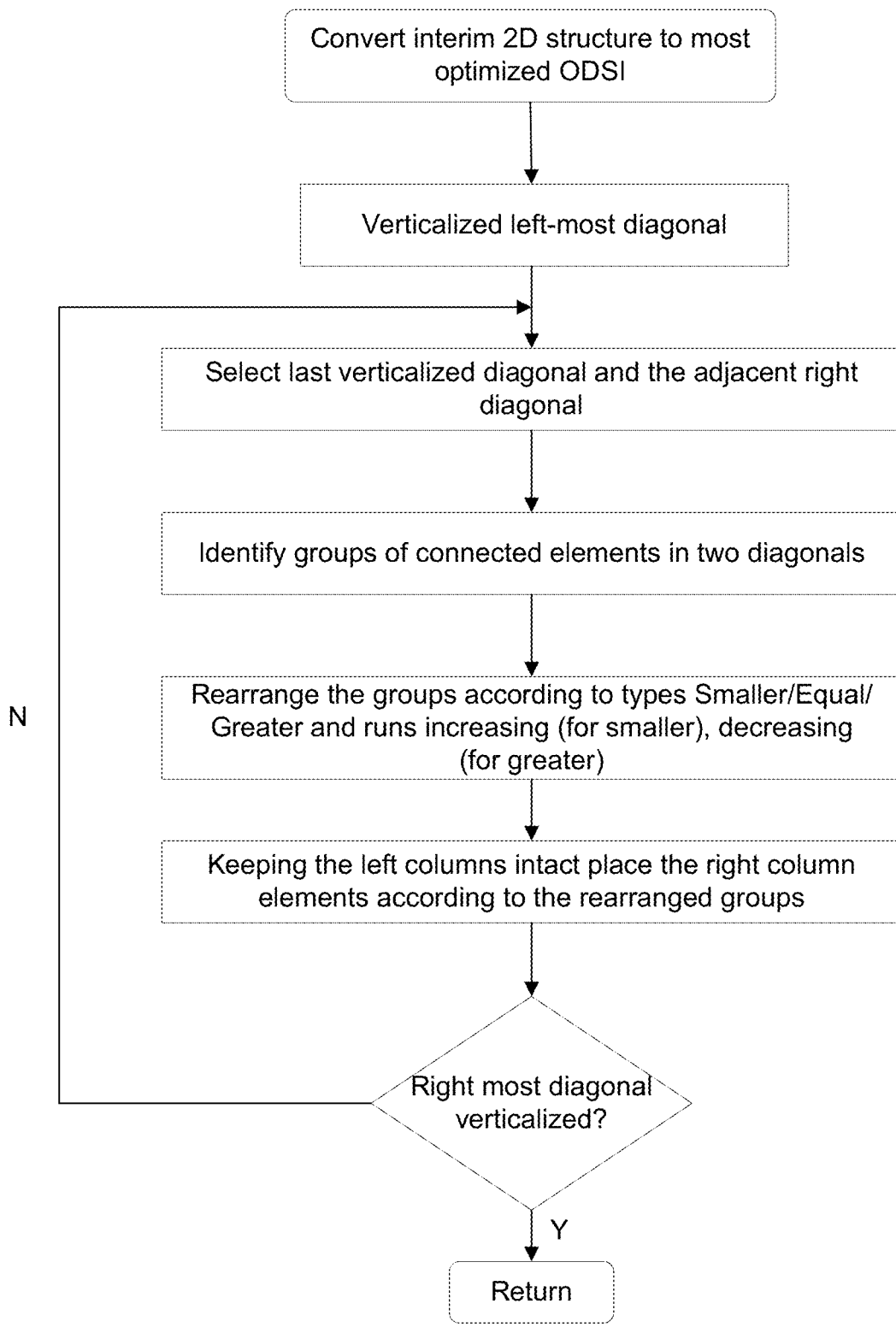
FIG. 34 is a diagram depicting an embodiment of the identification process in accordance with an embodiment of the present disclosure.

Referring now to FIG. 34, another embodiment consistent with identification process 10 is provided. In this example, a flowchart for converting interim two-dimensional structures to most-optimized ODSI is shown.

Figure 35:
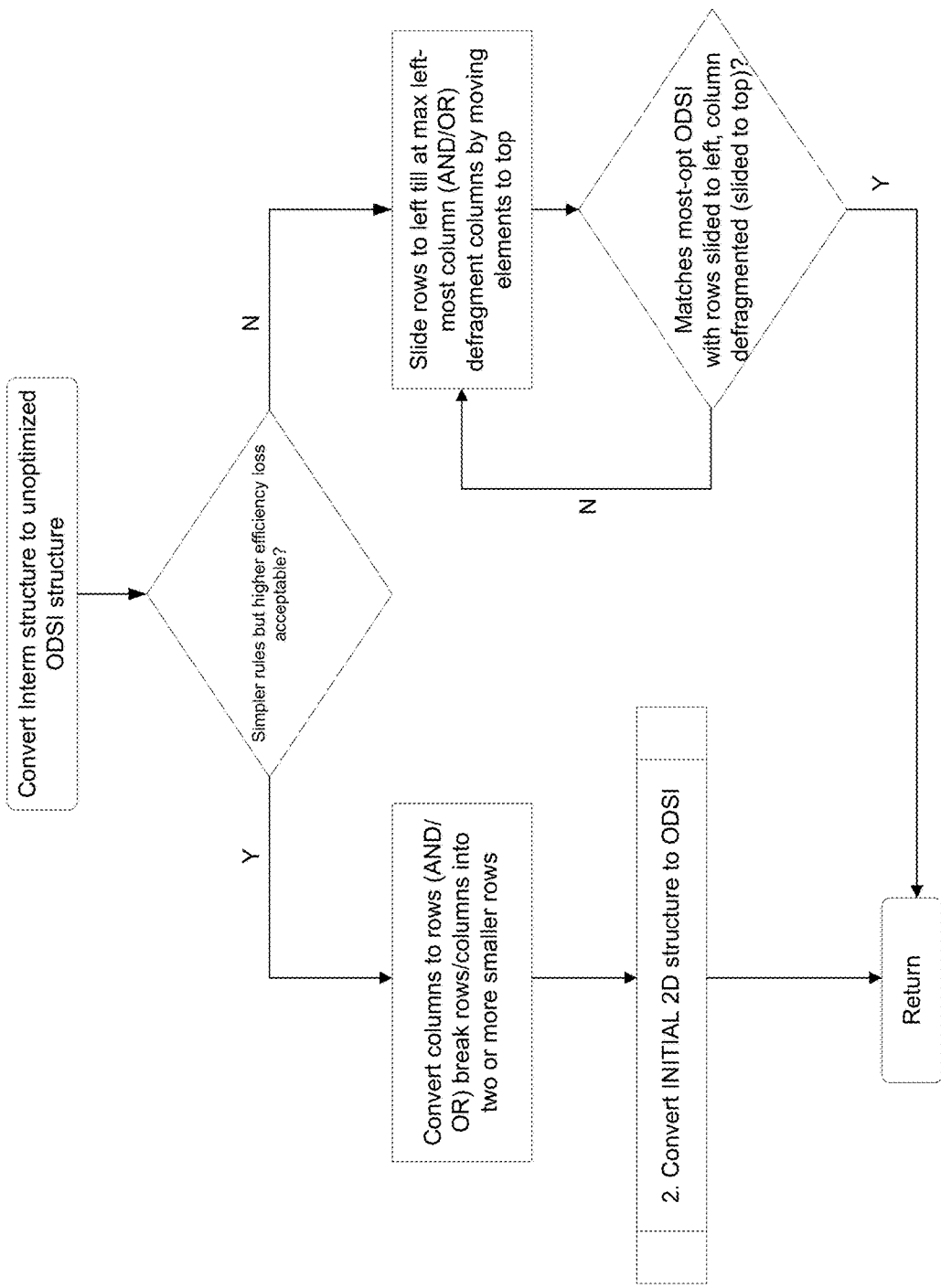
FIG. 35 is a diagram depicting an embodiment of the identification process in accordance with an embodiment of the present disclosure.

Referring now to FIG. 35, another embodiment consistent with identification process 10 is provided. In this example, a flowchart for converting interim structures to unoptimized ODSI structures is shown.

Embodiments of identification process 10 may be used in various applications, some of which may include, but are not limited to, image processing. For example, many image processing problems surround the issue of salt and pepper noise, which generates dots or other imperfections on a particular image. The filtering techniques described herein may address these issues as well as many others (e.g. by removing the dots without creating any smudging problems).

As discussed above, embodiments of the present disclosure provide for the median filtering and/or finding Nth min/max of 2-D structures of any shape and size using single step of sorting of 1-D arrays in one direction (e.g., either row or column direction). This may be used in combination with a sequence of steps involving elimination of non-candidates based on no. of elements smaller/greater than the element, partial sorting in the other direction (e.g., either column or row direction) as well as with rearrangements of diagonal elements in the direction of partial sorting and converting it into ODSI if not already.

Accordingly, embodiments of the identification process described herein may be configured to locate the median of all elements of a 2-D structure of any size and shape using a number of operations. In some embodiments, operations may include a full sorting of 1-D array(s). For example, one time sorting 1-D arrays in either direction (e.g., horizontal or vertical). In some embodiments we may assume rows sorting. Operations may further include identifying non-median elements. For example, assuming the first step is performed on rows, this may be followed by hypothetical sorting of columns (e.g., only for identifying and eliminating non-median candidates, no actual sorting) and identifying non-median candidate elements for whom the number of elements greater than or less than exceed the CEIL (e.g., the total number of elements/2). By this virtue some of the elements in the upper-left and bottom-right corners may be eliminated. Operations may also include partial sorting in other directions. For example, partial sorting of columns (e.g., a direction other than used in full sorting step) to form active diagonals containing potential median candidates. Operations may further include a rearrangement of diagonals. For example, a rearrangement of the remaining median candidates such that the diagonal elements are arranged carefully as columns. The diagonals may be arranged so that the sorting along rows is still conserved after the rearrangement of diagonal elements into columns.

In some embodiments, the previous three operations may be repeated to reduce potential median elements. For example, repeating the above three steps until only three or four diagonal elements remain as potential median elements. And the median of these three or four elements is the median of the entire input 2-D array.

Embodiments of the present disclosure provide a number of advantages over existing technologies. For example, embodiments included herein may convert the problem of median of total number of elements in the 2-D structure to a series of 1-D partial sortings, data rearrangement and elimination of non-median regions steps. Considering $n^2$ input elements, embodiments of the present disclosure may reduce the problem of complexity $O(n^4)$ into a small number of partial $O(n^2)$ problems. Additionally and/or alternatively, computations may be reduced further for finding the median of sliding 2-D windows due to reuse. Reuse of sorted elements in the full 1-D sorting step may be possible when the medians are computed for sliding 2-D blocks. It is evident that this operation may be performed by sorting only the newly introduced row or column and reusing the rest of the sorted elements.

In some embodiments, the teachings of the present disclosure may be applicable not only to rectangular or square shapes of even/odd rows and columns but may be applicable to any 2-D structures and therefore useful for any number of elements. In some embodiments, the structure may not need to be symmetric and may even be applied to situations where there is a missing element or region. This elimination method may also be applied for finding the nth maximum or minimum in a 2-D structure in numerous other applications, including, but not limited to, radar, etc. This method can also be applied in the finance domain to quote the median of salaries for the same work group of people by arranging the salary values in the form of 2-D structure.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for use in signal processing comprising:
    receiving, using at least one processor, a one or two-dimensional input block of data having one or more sorted or unsorted rows wherein each row includes one or more elements;
    adjusting the input block of data to generate a two-dimensional sorted block of data, wherein the two-dimensional sorted block of data is an orthogonal-direction sorting invariant structure;
    identifying at least one position within the two-dimensional sorted block of data that cannot contain a median value or a desired Nth sorted value;
    sorting the two-dimensional block of data along one or more columns to obtain one or more candidate elements that contain the median value or the desired Nth sorted value, wherein after sorting the two-dimensional block of data along one or more columns is performed, row sorting is preserved;
    discarding at least one non-candidate element to generate one or more remaining elements;
    rearranging the one or more remaining elements such that a number of diagonal elements form a column; and
    iteratively repeating one or more of the adjusting, identifying, sorting, discarding, and rearranging operations until a desired value of the input block of data is identified.

2. The computer-implemented method of claim 1, wherein identifying includes identifying at least one element located at a corner of the two-dimensional input block of data.

3. The computer-implemented method of claim 1, wherein the two-dimensional input block of data is an M×N block of data, where M, N are greater than or equal 1.

4. The computer-implemented method of claim 3, wherein the desired value is a median value.

5. The computer-implemented method of claim 3, wherein the desired value is an Nth minimum value.

6. The computer-implemented method of claim 3, wherein the desired value is an Nth maximum value.

7. The computer-implemented method of claim 3, wherein the desired value is a plurality of values.

8. The computer-implemented method of claim 1, wherein two-dimensional input block of data is sorted along columns and iteratively repeating includes sorting along one or more rows.

9. The computer-implemented method of claim 8, wherein iteratively repeating the sorting along one or more rows is performed partially.

10. The computer-implemented method of claim 9, wherein iteratively repeating the sorting along one or more rows is performed partially to identify at least one value to be discarded.

11. A system for use in signal processing comprising:
    a computing device having at least one processor configured to receive, using at least one processor, a one or two-dimensional input block of data having one or more sorted or unsorted rows wherein each row includes one or more elements, the at least one processor configured to adjust the input block of data to generate a two-dimensional sorted block of data, wherein the two-dimensional sorted block of data is an orthogonal-direction sorting invariant structure, and to identify at least one position within the two-dimensional sorted block of data that cannot contain a median value or a desired Nth sorted value, the at least one processor further configured to sort the two-dimensional block of data along one or more columns to obtain one or more candidate elements that contain the median value or the desired Nth sorted value, wherein after sorting the two-dimensional block of data along one or more columns is performed, row sorting is preserved, the at least one processor configured to discard at least one non-candidate element to generate one or more remaining elements and to rearrange the one or more remaining elements such that a number of diagonal elements form a column, the at least one processor further configured to iteratively repeat one or more of the adjusting, identifying, sorting, discarding, and rearranging operations until a desired value of the input block of data is identified.

12. The system of claim 11, wherein identifying includes identifying at least one element located at a corner of the two-dimensional input block of data.

13. The system of claim 11, wherein the two-dimensional input block of data is an M×N block of data, where M, N are greater than or equal 1 and the structure may have gap or missing regions in it.

14. The system of claim 13, wherein the desired value is a median value.

15. The system of claim 13, wherein the desired value is an Nth minimum value.

16. The system of claim 13, wherein the desired value is an Nth maximum value.

17. The system of claim 13, wherein the desired value is a plurality of values.

18. The system of claim 11, wherein two-dimensional input block of data is sorted along columns and iteratively repeating includes sorting along one or more rows.

19. The system of claim 18, wherein iteratively repeating the sorting along one or more rows is performed partially.

20. The system of claim 19, wherein iteratively repeating the sorting along one or more rows is performed partially to identify at least one value to be discarded.

* * * * *